US012697926B2

(12) United States Patent
Kim

(10) Patent No.: US 12,697,926 B2
(45) Date of Patent: Aug. 4, 2026

(54) ELECTRONIC DEVICE FOR PROVIDING BLIND SPOT IMAGE THROUGH PILLAR OF VEHICLE AND OPERATING METHOD OF THE SAME

(71) Applicant: THINKWARE CORPORATION, Seongnam-si (KR)

(72) Inventor: Tae Hyeong Kim, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 0 days.

(21) Appl. No.: 18/897,020

(22) Filed: Sep. 26, 2024

(65) Prior Publication Data

US 2025/0100461 A1 Mar. 27, 2025

(30) Foreign Application Priority Data

Sep. 27, 2023 (KR) ........................ 10-2023-0130286
Sep. 11, 2024 (KR) ........................ 10-2024-0123802

(51) Int. Cl.
*B60R 11/02* (2006.01)
*B60R 1/23* (2022.01)
*B60R 11/00* (2006.01)

(52) U.S. Cl.
CPC ............ *B60R 11/0229* (2013.01); *B60R 1/23* (2022.01); *B60R 2011/0022* (2013.01); *B60R 2300/105* (2013.01); *B60R 2300/202* (2013.01); *B60R 2300/802* (2013.01)

(58) Field of Classification Search
None
See application file for complete search history.

(56) References Cited

U.S. PATENT DOCUMENTS

| | | | | |
|---|---|---|---|---|
| 10,486,599 B2 * | 11/2019 | Baur | ........................ | B60R 1/007 |
| 10,960,822 B2 * | 3/2021 | Baur | ........................ | B60R 1/12 |
| 11,518,309 B2 * | 12/2022 | Hoyda | .................... | B60S 1/542 |
| 2007/0081262 A1 * | 4/2007 | Oizumi | .................... | B60R 1/25 |
| | | | | 359/843 |
| 2008/0309764 A1 * | 12/2008 | Kubota | .................... | B60R 1/25 |
| | | | | 348/148 |
| 2009/0201173 A1 * | 8/2009 | Okabe | .................... | G08G 1/167 |
| | | | | 340/905 |
| 2010/0259841 A1 * | 10/2010 | Matsumoto | ............... | B60R 1/10 |
| | | | | 359/857 |
| 2015/0055120 A1 * | 2/2015 | Le | ........................ | H04N 23/698 |
| | | | | 356/28 |

(Continued)

*Primary Examiner* — Daniel T Tekle

(74) *Attorney, Agent, or Firm* — ZION IP; Byungwoong Park

(57) ABSTRACT

The present disclosure provides an electronic device for providing a blind spot video through a front pillar of a vehicle and an operating method of the same. In the present disclosure, the electronic device is configured to have pillar display modules provided to front pillars, respectively, to detect at least one of blind spot videos that are obscured by front pillars of a vehicle using at least one external video of the vehicle, and to display at least one of the blind spot videos through at least one of the pillar display modules. In an example embodiment, the electronic device may acquire the external video from a front camera module and side camera modules mounted to the vehicle to provide a surround view video.

15 Claims, 12 Drawing Sheets

(56) References Cited

U.S. PATENT DOCUMENTS

| | | | | |
|---|---|---|---|---|
| 2016/0191794 A1* | 6/2016 | Varonos | ............... | H04N 23/698 |
| | | | | 348/36 |
| 2018/0037163 A1* | 2/2018 | Ukeda | ....................... | B60R 1/25 |
| 2019/0031102 A1* | 1/2019 | Kishimoto | ............... | B60R 1/30 |
| 2019/0100157 A1* | 4/2019 | Wang | .................. | B60R 11/0235 |
| 2019/0217780 A1* | 7/2019 | Yamaguchi | ............ | B60R 1/006 |
| 2021/0213879 A1* | 7/2021 | Sedaghat Amoli | ... | G06F 3/0487 |
| 2022/0363194 A1* | 11/2022 | Windeler | ............... | H04N 7/181 |
| 2025/0100461 A1* | 3/2025 | Kim | .................... | B60R 11/0229 |

* cited by examiner

473

475

ELECTRONIC DEVICE FOR PROVIDING BLIND SPOT IMAGE THROUGH PILLAR OF VEHICLE AND OPERATING METHOD OF THE SAME

CROSS-REFERENCE TO RELATED APPLICATION(S)

This application claims the priority benefit under 35 U.S.C. § 119 to Korean Patent Application No. 10-2023-0130286, filed on Sep. 27, 2023 and Korean Patent Application No. 10-2024-0123802, filed on Sep. 11, 2024, in the Korean Intellectual Property Office, the entire contents of which are incorporated herein by reference in their entirety.

BACKGROUND

1. Field

The present disclosure relates to an electronic device for providing a blind spot video through a frond pillar of a vehicle (also, referred to as A pillar) and an operating method of the same.

2. Description of Related Art

In general, vehicles have pillars that add strength between doors and the ceiling. Such pillars include a front pillar between a front window and a side window of a front door, a side pillar (also, referred to as B pillar) between side windows of the front door and a rear door, and a rear pillar (also, referred to as C pillar) between the side window and a rear window of the rear door. Some vehicles are missing at least one of the side pillar and the rear pillar.

Here, the front pillar of the vehicle provides a blind spot that blocks a driver's view who needs to keep an eye on the front and sides of the vehicle. In particular, when the vehicle turns, this blind spot interferes with the driver's driving. This threatens the safety of not only vehicle passengers including the driver but also pedestrians.

SUMMARY

The present disclosure provides an electronic device for providing a blind spot video through a front pillar of a vehicle and an operating method of the same.

In the present disclosure, an electronic device mounted to a vehicle may include at least two camera modules configured to capture external videos of the vehicle, respectively, pillar display modules provided to front pillars of the vehicle inside the vehicle, respectively, and a processor configured to connect to the camera modules and the pillar display modules, and to display at least one of blind spot videos that are obscured by the front pillars on at least one of the pillar display modules using at least one of the external videos.

In the present disclosure, an operating method of an electronic device mounted to a vehicle may include detecting at least one of blind spot videos that are obscured by front pillars of the vehicle using at least one external video of the vehicle, and displaying at least one of the blind spot videos through at least one of pillar display modules provided to the front pillars, respectively.

In the present disclosure, an electronic device mounted to a vehicle may include a front camera module configured to capture a front view video of the vehicle, side camera modules configured to capture side view videos of the vehicle, and a rear camera module configured to capture arear view video of the vehicle, pillar display modules provided to front pillars of the vehicle inside the vehicle, respectively, a main display module mounted inside the vehicle separate from the pillar display modules, and a processor configured to connect to the front camera module, the side camera modules, the rear camera module, the main display module, and the pillar display modules, and to display a surround view video on the main display module using the front view video, the side view videos, and the rear view video and to display at least one of blind spot videos that are obscured by the front pillars on at least one of the pillar display modules using at least one of the front view video and the side view videos.

In the present disclosure, an operating method of an electronic device mounted to a vehicle may include capturing a front view video, side view videos, and a rear view video of the vehicle, displaying a surround view video on a main display module using the front view video, the side view videos, and the rear view video in response to a user input, and activating at least one of pillar display modules provided to the front pillars, respectively, and displaying at least one of blind spot videos that are obscured by the front pillars on at least one of the pillar display modules using at least one of the front view video and the side view videos in response to the user input.

According to the present disclosure, a blind spot obscured by front pillars of a vehicle may be removed. That is, an electronic device may display at least one of blind spot videos obscured by the front pillars of the vehicle on at least one of pillar display modules provided to the front pillars. Through this, a driver may look ahead and sides of the vehicle without the blind spot obscured by the front pillars. In particular, when the vehicle is turning, the driver may easily verify a surrounding situation of the vehicle without the blind spot. This ensures the safety of not only vehicle passengers including the driver but also pedestrians.

According to first example embodiments, since blind spot videos are generated using external videos from camera modules generally mounted to the vehicle for a surround view monitoring function, there is no need to add other camera modules. This may prevent an increase in work time, an increase in installation cost, and an increase in vehicle weight due to addition of other camera modules. According to second example embodiments, since blind spot videos are generated using external videos from camera modules additionally mounted to the vehicle for a blind monitoring function through pillar display modules, the operating load of a processor within the electronic device may be reduced. This is because the processor does not need to synthesize a plurality of external videos to generate a single blind spot video.

DETAILED DESCRIPTION

Hereinafter, various example embodiments are described with reference to the accompanying drawings.

Figure 1:
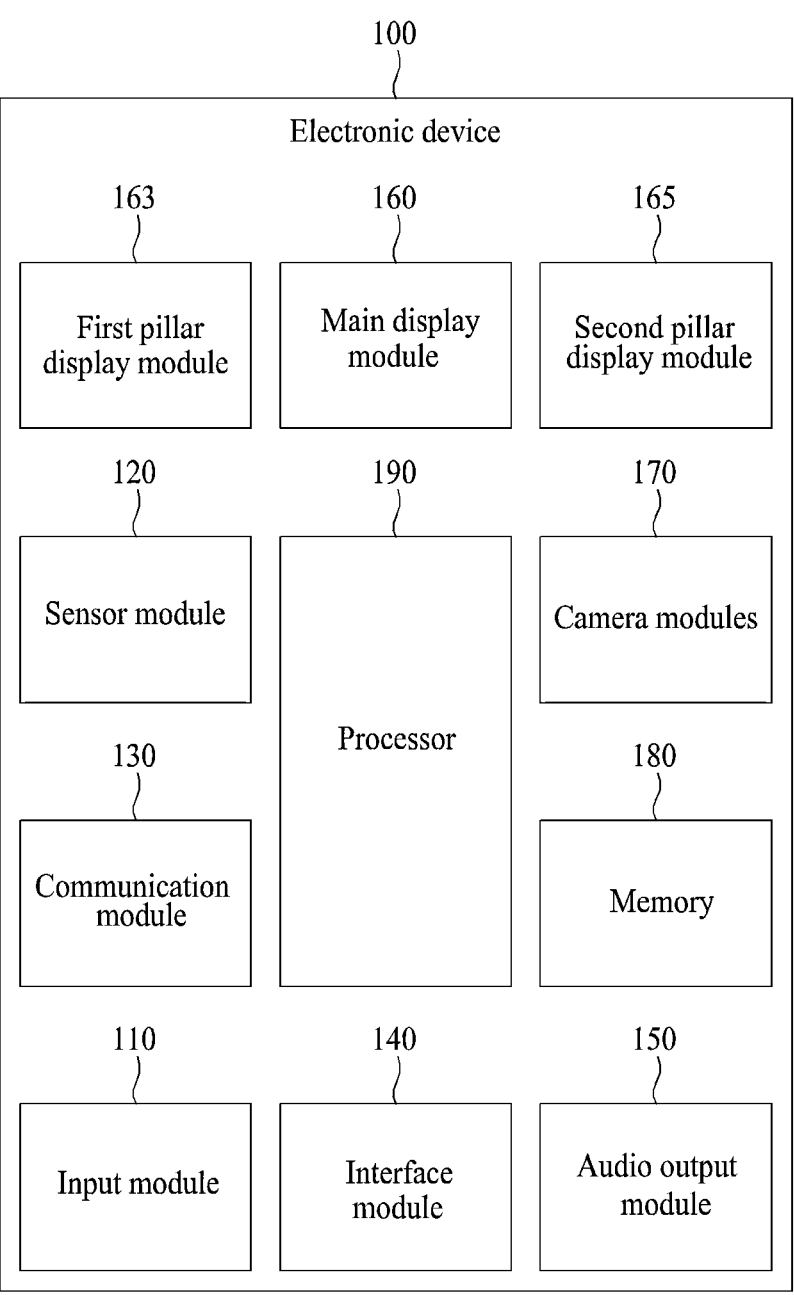
FIG. 1 is a block diagram illustrating an electronic device according to various example embodiments.
Figure 2:
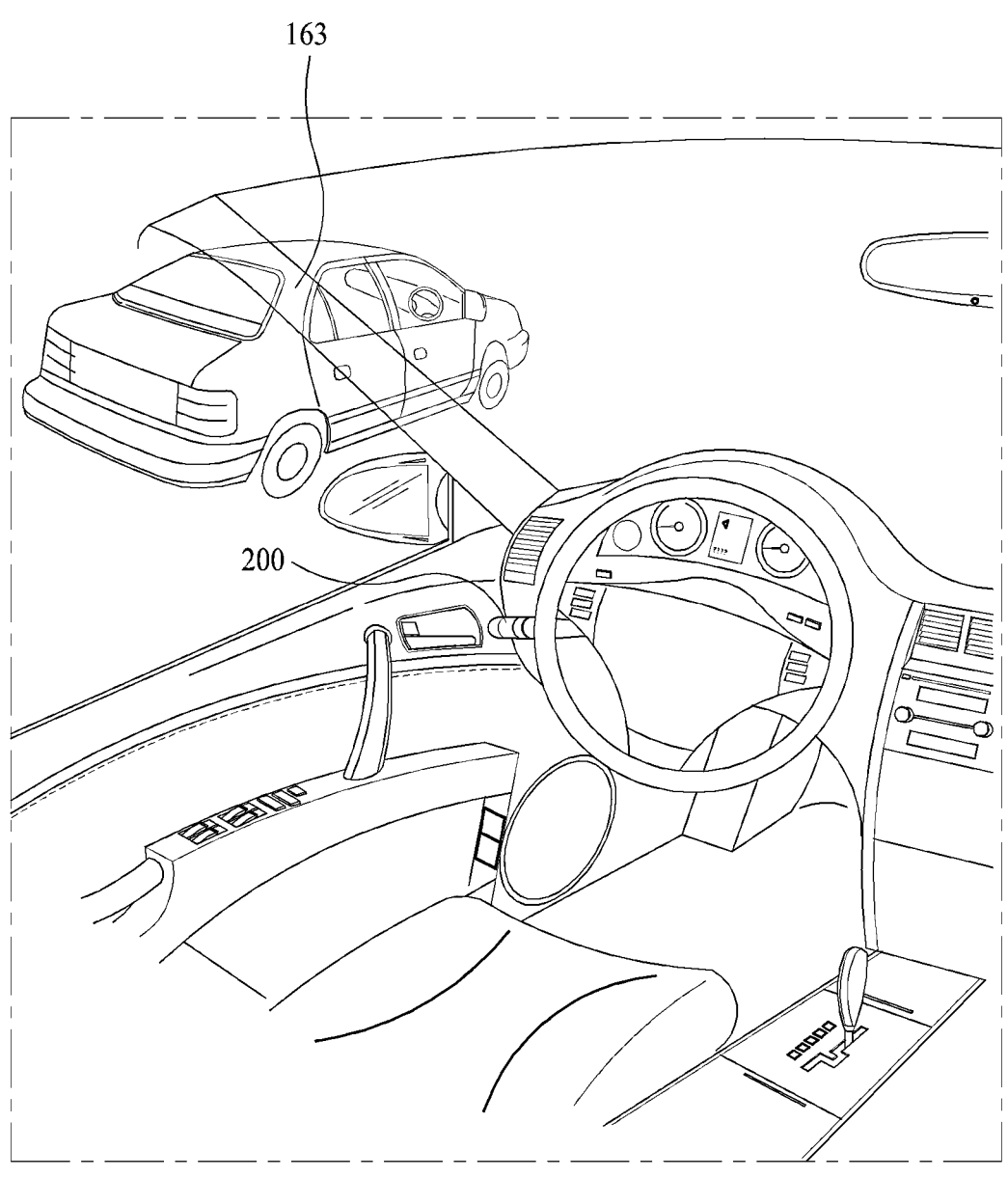
FIG. 2 illustrates an example of describing a characteristic function of an electronic device according to various example embodiments.

FIG. 1 is a block diagram illustrating an electronic device 100 according to various example embodiments. FIG. 2 is a block diagram illustrating a characteristic function of the electronic device 100 according to various example embodiments.

Referring to FIGS. 1 and 2, the electronic device 100 may be mounted to a vehicle. The electronic device 100 may include at least one of an input module 110, a sensor module 120, a communication module 130, an interface module 140, an audio output module 150, a main display module 160, pillar display modules 163 and 165, camera modules 170, a memory 180, and a processor 190. In some example embodiments, at least one of the components of the electronic device 100 may be omitted, and at least one another component may be added. In some example embodiments, at least two of the components of the electronic device 100 may be implemented as a single integrated circuit.

The input module 110 may input a signal to be used for at least one component of the electronic device 100. For example, the input module 110 may include at least one of a key, a button, a keyboard, a keypad, a mouse, a joystick, and a microphone. In some example embodiments, the input module 110 may include at least one of a touch circuitry configured to detect a touch and a sensor circuitry configured to measure strength of force generated by touch.

The sensor module 120 may generate an electrical signal or a data value corresponding to an internal operation state (e.g., power or temperature) of the electronic device 100 or an external environmental state. For example, the sensor module 120 may include at least one of a global positioning system (PGS) sensor, a radar sensor, a light detection and ranging (LIDAR) sensor, a motion sensor, a gesture sensor, a gyro sensor, a barometric pressure sensor, a magnetic sensor, an acceleration sensor, a grip sensor, a proximity sensor, a color sensor, an infrared (IR) sensor, a biosignal sensor, a temperature sensor, a humidity sensor, and an illuminance sensor.

The communication module 130 may communicate with an external device. The communication module 130 may establish a communication channel between the electronic device 100 and the external device and may communicate with the external device through the communication channel. Here, the external device may include at least one of a satellite, a base station, a server, and another electronic device. The communication module 130 may include at least one of a wired communication module and a wireless communication module. The wired communication module may be connected to the external device in a wired manner and may communicate with the external device in the wired manner through a connection terminal. The wireless communication module may include at least one of a near field communication module and a far field communication module. The near field communication module may communicate with the external device using a near field communication scheme. For example, the near field communication scheme may include at least one of Bluetooth, wireless fidelity (WiFi) direct, near field communication (NFC), and infrared data association (IrDA). The far field communication module may communicate with the external device using a far field communication scheme. Here, the far field communication module may communicate with the external device over a network. For example, the network may include at least one of a cellular network, the Internet, and a computer network such as a local area network (LAN) and a wide area network (WAN).

The interface module 140 may be provided for connection with an external device. In detail, the interface module 140 may support a designated protocol connectable to the external device in a wired or wireless manner. Here, the external device may include a component related to driving of the vehicle. For example, the corresponding component may include a lever 200 for manipulating a turn signal lamp, that is, a left turn signal lamp and a right turn signal lamp, as shown in FIG. 2. For example, the interface module 140 may include at least one of an HDMI, a USB interface, an SD card interface, and an audio interface.

According to various example embodiments, at least one of the input module 110, the sensor module 120, the communication module 130, and the interface module 140 may generate a user input. In an example embodiment, the input module 110 or an arbitrary sensor of the sensor module 120 may generate the user input based on a signal that is directly input from the user. For example, the input module 110 may generate the user input based on at least one of key (e.g., hard key or soft key) input or voice input. For example, at least one of a motion sensor, a gesture sensor, a proximity sensor, a temperature sensor, an illuminance sensor of the sensor module 120 may generate the user input based on a change in an external environmental state. In another example embodiment, the communication module 130 may generate the user input based on a signal that is input from another electronic device used by the user. In another example embodiment, the interface module 140 may generate the user input based on a signal that is generated in the vehicle in response to the vehicle being manipulated by the user and input from the vehicle. For example, the interface module 140 may detect the manipulation of the lever 200 for manipulating the turn signal lamp and, in response thereto, generate the user input.

The audio output module 150 may output an audio signal. For example, the audio output module 150 may include at least one of a speaker and a receiver. In an example embodiment, the audio output module 150 may include at least one voice coil that provides vibration to a diaphragm within the speaker and a magnet capable of forming a magnetic field. When current flows in the voice coil, the magnetic field formed in the voice coil may vibrate the voice coil through interaction with the magnetic field formed by the magnet. The diaphragm connected to the voice coil may vibrate based on vibration of the voice coil. The speaker may output the audio signal based on the vibration of the diaphragm.

The main display module 160 may display information. The main display module 160 may output visualized information for the driver. Here, the main display module 160 may be provided around the driver's seat, for example, a dashboard of the vehicle such that the driver of the vehicle may verify the information from the driver's seat. For example, the main display module 160 may include at least one of a display, a hologram device, and a projector. For example, the main display module 160 may be implemented as a touch screen by being assembled with at least one of a touch circuitry and a sensor circuitry of the input module 110. The main display module 160 may be controlled by the processor 190 that includes a circuit, such as a graphic processing unit (GPU), to output visualized information for the user.

The pillar display modules 163 and 165 may display blind spot videos that are obscured by front pillars of the vehicle. Here, the pillar display modules 163 and 165 may be provided to the front pillars of the vehicle inside the vehicle, respectively, such that the driver of the vehicle may view blind spot videos from the driver's seat. The pillar display modules 163 and 165 may include the first pillar display module 163 provided to the front pillar on the left inside the vehicle and the second pillar display module 165 provided on the front pillar on the right inside the vehicle. Here, dimensions (particularly, area) of the pillar display modules 163 and 165 may be substantially similar to dimensions of the front pillars. For example, the pillar display modules 163 and 165 may include at least one of a display, a hologram device, and a projector. For example, the pillar display modules 163 and 165 may be implemented as a touch screen by being assembled with at least one of a touch circuitry and a sensor circuitry of the input module 110.

The camera modules 170 may capture external videos of the vehicle. Here, the camera modules 170 may be provided at different locations of the vehicle, respectively, and may capture external videos of the vehicle in different directions. For example, the camera modules 170 may include at least one of one or more lenses, an image sensor, a flash, and an image signal processor (ISP). For example, in the camera modules 170, some of the one or more lenses may have the same lens property (e.g., angle of view, focal distance, autofocus, f number, or optical zoom). The one or more lenses may include a light source lens or a telephoto lens. For example, the image sensor may convert light emitted or reflected from a subject and transmitted through the one or more lenses to an electrical signal, and may acquire an image corresponding to the subject. According to an example embodiment, the image sensors may include, for example, a single image sensor selected from among image sensors with different properties such as a red-green-blue (RGB) sensor, a black and white (BW) sensor, an IF sensor, or a UV sensor, a plurality of image sensors with the same property, or a plurality of image sensors with different properties. Each image sensor included in the image sensors may be implemented using, for example, a charged coupled device (CCD) sensor or a complementary metal oxide semiconductor (CMOS) sensor. For example, the flash may include one or more light emitting diodes (e.g., red-green-blue (RGB) LED, white LED, infrared LED, or ultraviolet LED), or a xenon lamp. According to some example embodiments, each of the camera modules 170 may include a serializer. The serializer may convert each external video from parallel data to serial data.

The memory 180 may store a variety of data used by at least one component of the electronic device 100. For example, the memory 180 may include at least one of a volatile memory and a non-volatile memory. Data may include at least one program and input data or output data related thereto. The program may be stored in the memory 180 as software including at least one instruction, and for example, may include at least one of an operating system (OS), middleware, and an application.

The processor 190 may control at least one component of the electronic device 100. Through this, the processor 190 may perform data processing or operations. For example, hardware for processing data may include an arithmetic and logic unit (ALU), a floating point unit (FPU), a field programmable gate array (FPGA), a central processing unit (CPU), and/or an application processor (AP). The processor 190 may have a structure of a single-core processor or a multi-core processor such as dual core, quad core, hexa core, or octa core. According to example embodiments, the processor 190 may execute instructions stored in the memory 180. The processor 190 may acquire external videos through the camera modules 170. In some example embodiments, the processor 190 may include a deserializer. The deserializer may convert each external video from serial data to parallel data.

According to various example embodiments, the processor 190 may process external videos. In particular, the processor 190 may perform a characteristic function of generating at least one of blind spot videos using at least one of the external videos and displaying the blind spot video on at least one of the pillar display modules 163 and 165 as shown in FIG. 2. FIG. 2 illustrates an example in which the blind spot video is displayed on the first pillar display module 163, but similarly, the blind spot video may be displayed on the second pillar display module 165. In an example embodiment, the processor 190 may include a central processing unit (CPU). In this case, the central processing unit may perform the corresponding function. In another example embodiment, the processor 190 may include not only the central processing unit but also a display controller for the pillar display modules 163 and 165 (e.g., LCD controller when the pillar display modules 163 and 165 include liquid crystal display (LCD)). In this case, at least one of the central processing unit and the display controller may perform the corresponding function.

To this end, in response to a first user input, the processor 190 may activate at least one of the pillar display modules 163 and 165. Meanwhile, in response to a second user input, the processor 190 may deactivate at least one of the pillar display modules 163 and 165. For example, the first user input may be to turn on the vehicle's turn signal lamp, that is, one of a left turn signal lamp and a right turn signal lamp, and the second user input may be to turn off the turn signal lamp, that is, one of the left turn signal lamp and the right turn signal lamp. In an example embodiment, the processor 190 may activate all of the pillar display modules 163 and 165 in response to the first user input, and may deactivate all of the pillar display modules 163 and 165 in response to the second user input. For example, when the turn signal lamp, that is, the left turn signal lamp or the right turn signal lamp is turned on, the processor 190 may activate all of the pillar display modules 163 and 165, and when the turn signal lamp, that is, one of the left turn signal lamp and the right turn signal lamp is turned off again, the processor 190 may deactivate all of the pillar display modules 163 and 165. In another example embodiment, the processor 190 may activate one of the pillar display modules 163 and 165 in response to the first user input and may deactivate one of the pillar display modules 170 in response to the second user input. For example, when the left turn signal lamp is turned on, the processor 190 may activate the first pillar display module 163, and when the left turn signal lamp is turned off again, the processor 190 may deactivate the first pillar display module 163. As another example, when the right turn signal lamp is turned on, the processor 190 may activate the second pillar display module 165, and when the right turn signal lamp is turned off again, the processor 190 may deactivate the second pillar display module 165.

Additionally, the processor 190 may detect reference information by analyzing at least one of external videos and may display the reference information on at least one of the pillar display modules 163 and 165 with the blind spot video. The reference information may be information within at least one of the external videos, for example, a road sign, and may be information derived from at least one of the external videos, for example, a distance from an adjacent vehicle and a speed of the adjacent vehicle. Here, the reference information may be displayed using various graphical representations, for example, text, symbol, and image.

Additionally, the processor 190 may adjust the pillar display modules 163 and 165 using a sensing input that is input through the sensor module 120. For example, the processor 190 may detect the sensing input indicating ambient brightness, which is input through the illuminance sensor. In this case, the processor 190 may change at least one of the brightness and reflectance of the pillar display modules 163 and 165 using the sensing input.

Figure 3A:
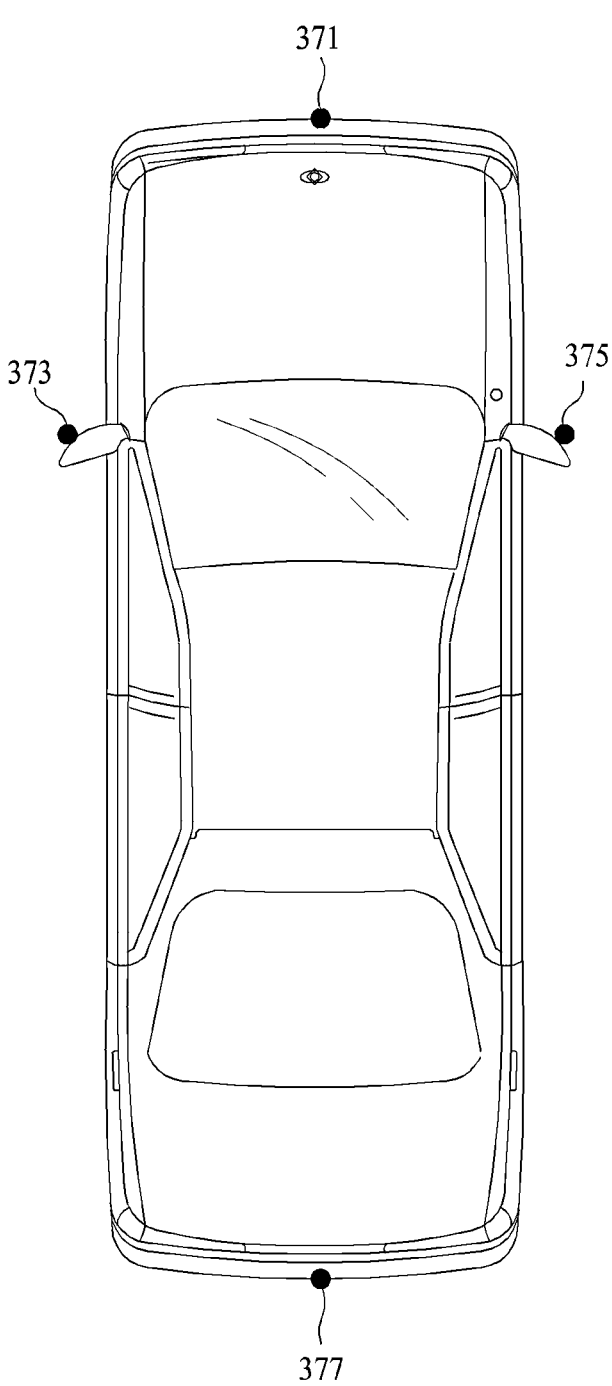
FIG. 3A illustrates an example of describing the configuration of camera modules in an electronic device according to first example embodiments.
Figure 3B:
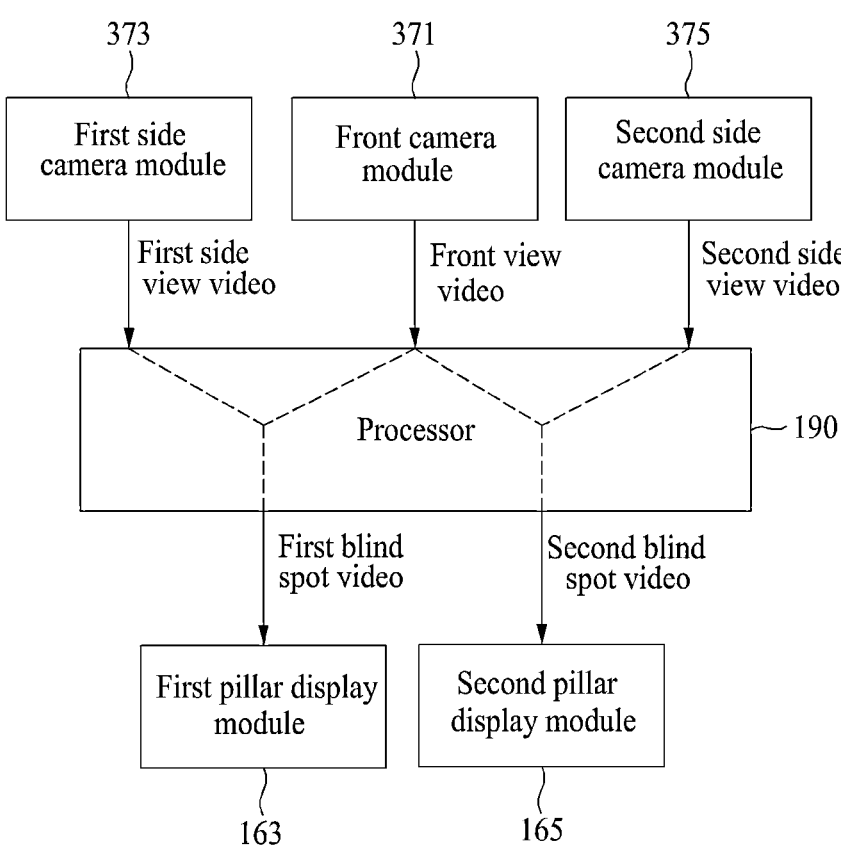
FIG. 3B illustrates an example of describing an operation characteristic of an electronic device according to the first example embodiments.

FIG. 3A illustrates an example of describing the configuration of the camera modules 170 in the electronic device 100 according to first example embodiments. FIG. 3B illustrates an example of describing an operation characteristic of the electronic device 100 according to the first example embodiments.

Referring to FIG. 3A, the camera modules 170 may be mounted to a vehicle for a surround view monitoring (SVM) (also, referred to as around view monitoring (AVM)) function. In detail, the camera modules 170 may include a front camera module 371 configured to capture a front view video of the vehicle, side camera modules 373 and 375 configured to capture side view videos of the vehicle, respectively, and a rear camera module 377 configured to capture a rear view video of the vehicle. The side camera modules 373 and 375 may include the first side camera module 373 configured to capture a first side view video on the left of the vehicle and the second side camera module 375 configured to capture a second side view video on the right of the vehicle.

In this case, the processor 190 may generate a surround view video using the front view video, the side view videos, and the rear view video. In detail, the processor 190 may activate the surround view video monitoring function in response to a user input that requests the surround view video. In this function, the processor 190 may generate the surround view video by synthesizing the front view video, the side view videos, and the rear view video. In an example embodiment, the processor 190 may perform video processing on the front view video, the side view videos, and the rear view video toward the floor, for example, the ground and then may synthesized the respective video processed videos. In another example embodiment, the processor 190 may synthesize the front view video, the side view videos, and the rear view video and then may perform video processing toward the floor, for example, the ground. Through this, the processor 190 may display the surround view video on the main display module 160.

Meanwhile, the processor 190 may generate at least one blind spot video using at least one of the front view video and the side view videos. In detail, as shown in FIG. 3B, the processor 190 may synthesize the front view video and the first side view video and may detect a first blind spot video to display on the first pillar display module 163. Through this, the processor 190 may display the first blind spot video on the first pillar display module 163. Meanwhile, as shown in FIG. 3B, the processor 190 may synthesize the front view video and the second side view video and may detect a second blind spot video to display on the second pillar display module 165. Through this, the processor 190 may display the second blind spot video on the second pillar display module 165.

Figure 4A:
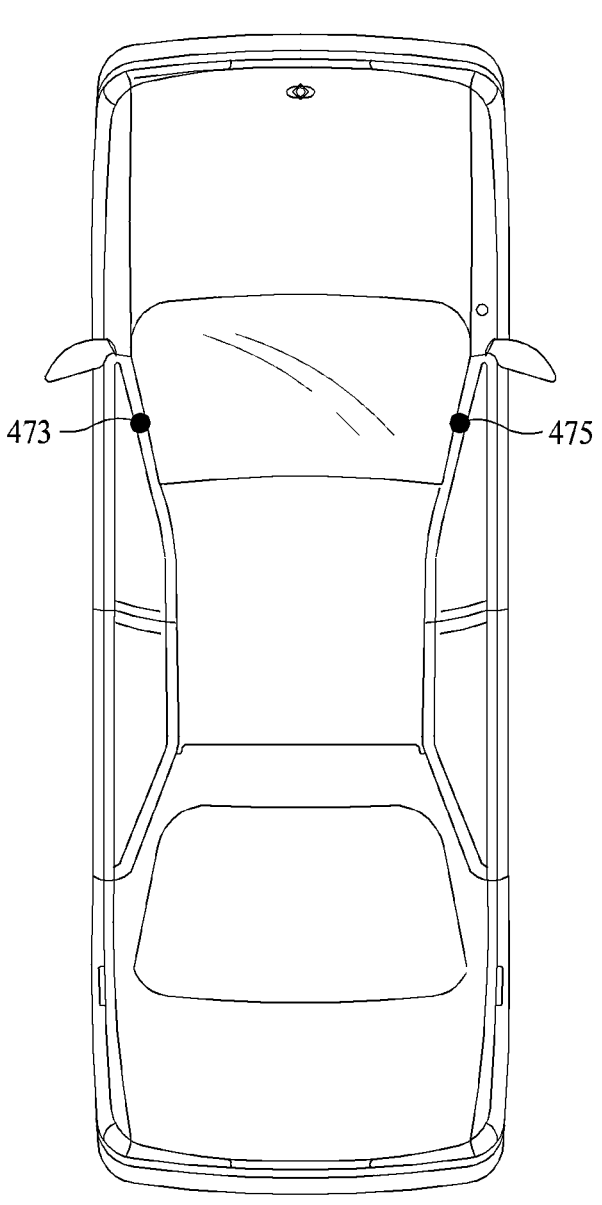
FIG. 4A illustrates an example of describing the configuration of camera modules in an electronic device according to second example embodiments.
Figure 4B:
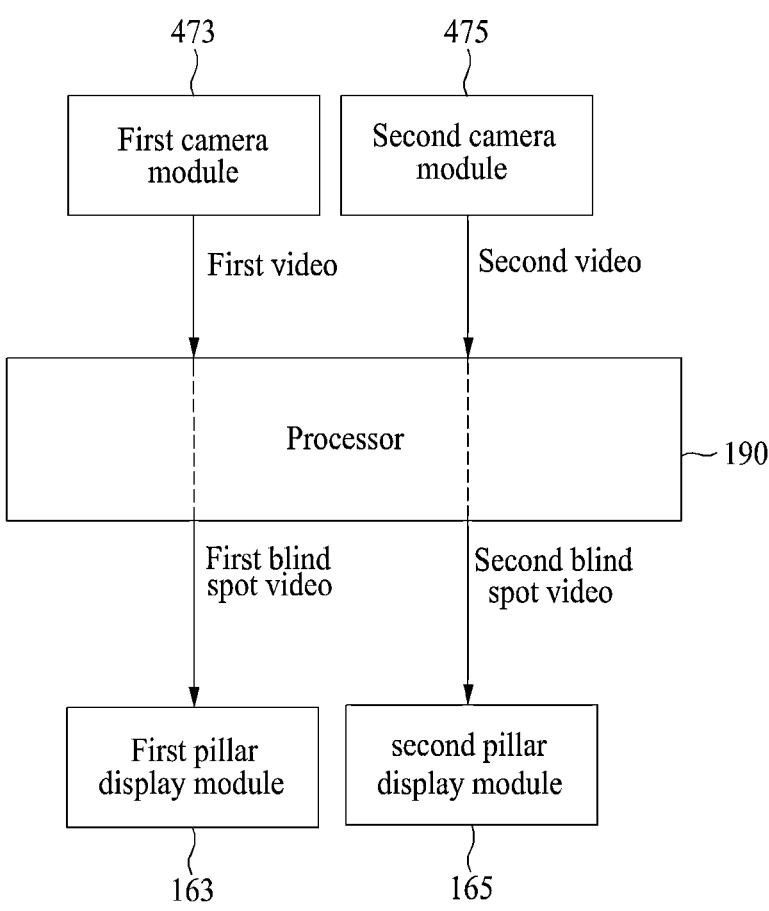
FIG. 4B illustrates an example of describing an operation characteristic of an electronic device according to the second example embodiments.

FIG. 4A illustrates an example of describing the configuration of the camera modules 170 in the electronic device 100 according to second example embodiments. FIG. 4B illustrates an example of describing an operation characteristic of the electronic device 100 according to the second example embodiments.

Referring to FIG. 4A, the camera modules 170 may be mounted to the vehicle for a blind spot monitoring function through the pillar display modules 163 and 165. In detail, the camera modules 170 may be mounted to the front pillars, respectively, on the outside of the vehicle. The camera modules 170 may include a first camera module 473 provided to a front pillar on the left of the vehicle and configured to capture a first video and a second camera module 475 provided to a front pillar on the right of the vehicle and configured to capture a second video.

In this case, the processor 190 may generate at least one blind spot video using at least one of the first video and the second video. In detail, as shown in FIG. 4B, the processor 190 may detect a first blind spot video to display on the first pillar display module 163 in the first video. Through this, the processor 190 may display the first blind spot video on the first pillar display module 163. Meanwhile, as shown in FIG. 4B, the processor 190 may detect a second blind spot video to display on the second pillar display module 165 in the second video. Through this, the processor 190 may display the second blind spot video on the second pillar display module 165.

As described above, in the electronic device 100 according to the first example embodiments, the camera modules 170 may include the front camera module 371 configured to capture the front view video of the vehicle, the side camera modules 373 and 375 configured to capture side view videos of the vehicle, respectively, and the rear camera module 377 configured to capture the rear view video of the vehicle. The side camera modules 373 and 375 may include the first side camera module 373 configured to capture the first side view video on the left of the vehicle and the second side camera module 375 configured to capture the second side view video on the right of the vehicle. Example embodiments regarding an operating method of this electronic device 100 are described with reference to FIGS. 5 and 6.

Figure 5:
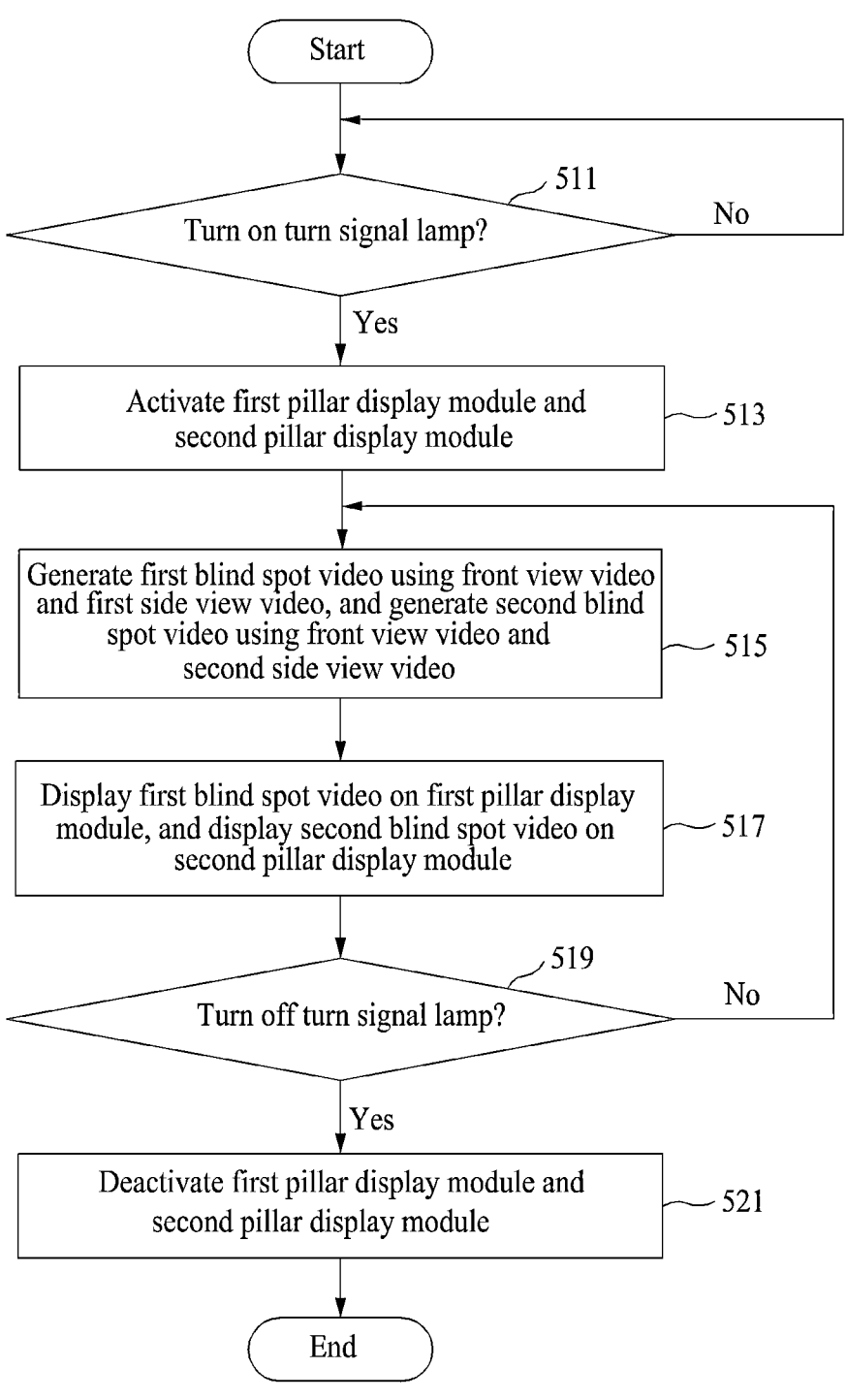
FIG. 5 is a flowchart illustrating an operating method of an electronic device according to an example embodiment among the first example embodiments.

FIG. 5 is a flowchart illustrating an operating method of the electronic device 100 according to an example embodiment among the first example embodiments.

Referring to FIG. 5, in operation 511, the electronic device 100 may detect a first user input for turning on a turn signal lamp. In detail, if a user manipulates the lever 200 to turn on the turn signal lamp, that is, one of a left turn signal lamp and a right turn signal lamp, the interface module 140 may generate the first user input and may transmit the first user input to the processor 190. Therefore, the processor 190 may detect the first user input through the interface module 140.

In response thereto, in operation 513, the electronic device 100 may activate all of the pillar display modules 163 and 165. In detail, in a state in which the first pillar display module 163 and the second pillar display module 165 are deactivated, the processor 190 may activate the first pillar display module 163 and the second pillar display module 165. Through this, while the turn signal lamp, that is, one of the left turn signal lamp and the right turn signal lamp is turned on, the first pillar display module 163 and the second pillar display module 165 may be maintained in an activated state.

Then, in operation 515, the electronic device 100 may generate blind spot videos using a front view video and side view videos. In detail, the processor 190 may acquire the front view video, a first side view video, and a second side view video from the front camera module 371, the first side camera module 373, and the second side camera module 375, respectively. Here, the processor 190 may correct each of the front view video, the first side view video, and the second side view video through camera calibration. Here, the processor 190 may remove distortion for each of the front view video, the first side view video, and the second side view video. Then, the processor 190 may generate a first blind spot video by synthesizing the front view video and the first side view video, and may generate a second blind spot video by synthesizing the front view video and the second side view video. Here, configuration information that includes locations and dimensions of the pillar display modules 163 and 165 in the vehicle may be stored in the memory 180. In more detail, the processor 190 may synthesize the front view video and the first side view video into a single video and may detect the first blind spot video by cropping the corresponding single video based on the configuration information. Similarly, the processor 190 may synthesize the front view video and the second side view video into a single video and may detect the second blind spot video by cropping the corresponding single video based on the configuration information.

Then, in operation 517, the electronic device 100 may display the blind spot videos on the pillar display modules 163 and 165, respectively. The processor 190 may display the first blind spot video on the first pillar display module 163, and may display the second blind spot video on the second pillar display module 165. In more detail, the processor 190 may resize the first blind spot video in correspondence to a display area of the first pillar display module 163 and then display the same on the first pillar display module 163. Similarly, the processor 190 may resize the second blind spot video in correspondence to a display area of the second pillar display module 165 and then display the same on the second pillar display module 165.

Then, in operation 519, the electronic device 100 may repeat operations 515 and 517 until a second user input for turning off the turn signal lamp is detected. In detail, the processor 190 may continuously generate the blind spot videos using the front view video and the side view videos, and may display the blind spot videos on the pillar display modules 163 and 165, respectively.

Meanwhile, in operation 519, the electronic device 100 may detect the second user input for turning off the turn signal lamp. In detail, if the user manipulates the lever 200 to turn off the turn signal lamp, that is, one of the left turn signal lamp and the right turn signal lamp, the interface module 140 may generate the second user input and may transmit the second user input to the processor 190. Therefore, the processor 190 may detect the second user input through the interface module 140.

In response thereto, in operation 521, the electronic device 100 may deactivate all of the pillar display modules 163 and 165. In detail, in a state in which the first pillar display module 163 and the second pillar display module 165 are activated, the processor 190 may deactivate the first pillar display module 163 and the second pillar display module 165. Through this, while the turn signal lamp, that is, the left turn signal lamp and the right turn signal lamp are turned off, the first pillar display module 163 and the second pillar display module 165 may be maintained in a deactivated state.

According to the example embodiment, while the turn signal lamp, that is, one of the left turn signal lamp and the right turn signal lamp is turned on, the electronic device 100 may display the blind spot videos on the pillar display modules 163 and 165. In detail, while the vehicle is turning left, the processor 190 may display the second blind spot video on the second pillar display module 165 with displaying the first blind spot video on the first pillar display module 163. Alternatively, while the vehicle is turning right, the processor 190 may display the second blind spot video on the second pillar display module 165 with displaying the first blind spot video on the first pillar display module 163.

Figure 6:
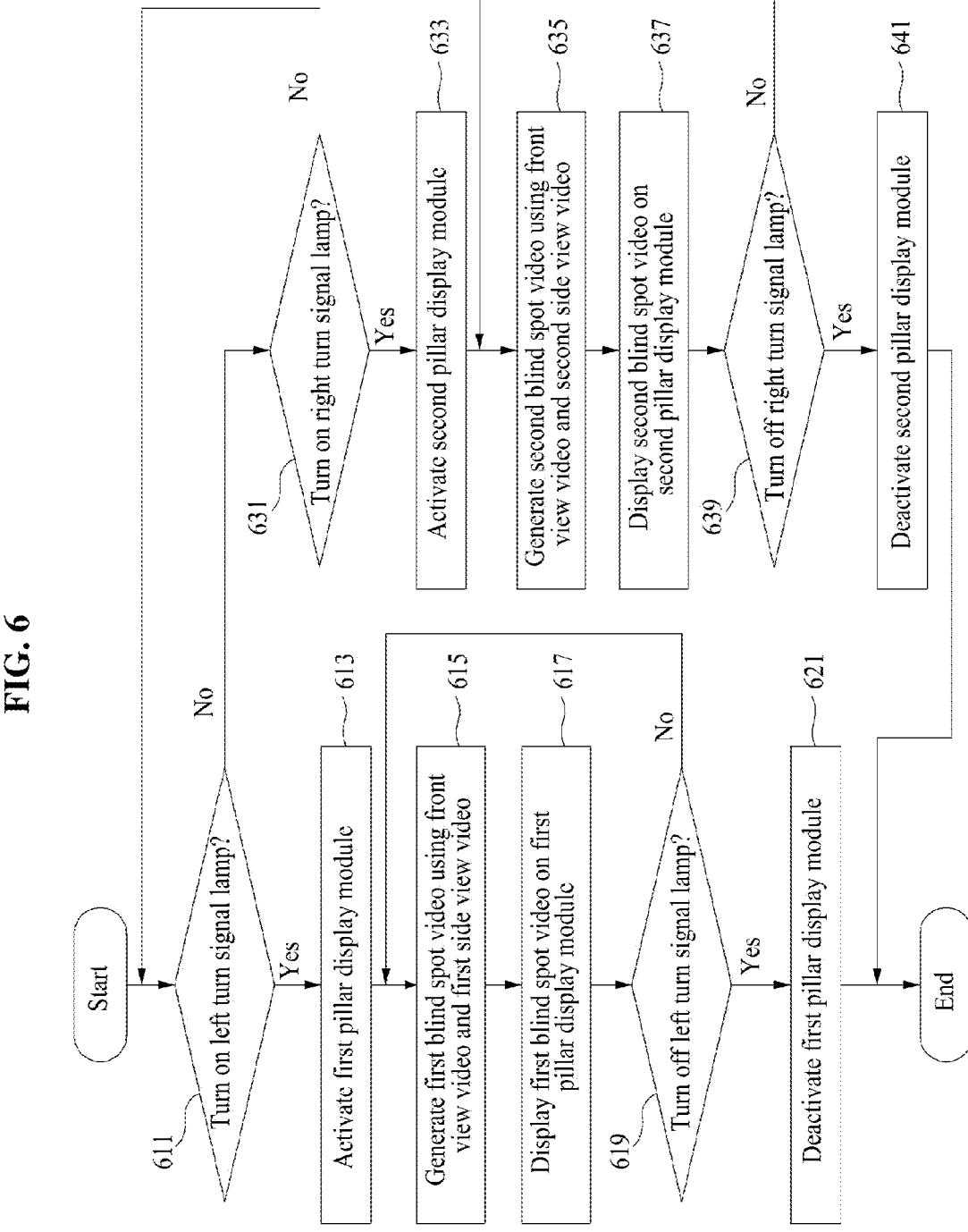
FIG. 6 is a flowchart illustrating an operating method of an electronic device according to another example embodiment among the first example embodiments.

FIG. 6 is a flowchart illustrating an operating method of the electronic device 100 according to another example embodiment among the first example embodiments.

Referring to FIG. 6, in operation 611, the electronic device 100 may detect a first user input for turning on a left turn signal lamp. In detail, if the user manipulates the lever 200 to turn on the left turn signal lamp, the interface module 140 may generate the first user input and may transmit the first user input to the processor 190. Therefore, the processor 190 may detect the first user input through the interface module 140.

In response thereto, in operation 613, the electronic device 100 may activate the first pillar display module 163. In detail, in a state in which the first pillar display module 163 and the second pillar display module 165 are deactivated, the processor 190 may activate the first pillar display module 163. Through this, while the left turn signal lamp is turned on, the first pillar display module 163 may be maintained in an activated state and the second pillar display module 165 may be maintained in a deactivated state.

Then, in operation 615, the electronic device 100 may generate a first blind spot video using a front view video and a first side view video. In detail, the processor 190 may acquire the front view video and the first side view video from the front camera module 371 and the first side camera module 373, respectively. Here, the processor 190 may correct each of the front view video and the first side view video through camera calibration. Here, the processor 190 may remove distortion for each of the front view video and the first side view video. Then, the processor 190 may generate the first blind spot video by synthesizing the front view video and the first side view video. Here, configuration information that includes locations and dimensions of the pillar display modules 163 and 165 in the vehicle may be stored in the memory 180. In more detail, the processor 190 may synthesize the front view video and the first side view video into a single video and may detect the first blind spot video by cropping the corresponding single video based on the configuration information.

Then, in operation 617, the electronic device 100 may display the first blind spot video on the first pillar display module 163. In detail, the processor 190 may resize the first blind spot video in correspondence to a display area of the first pillar display module 163 and then display the same on the first pillar display module 163.

Then, in operation 619, the electronic device 100 may repeat operations 615 and 617 until a second user input for turning off the left turn signal lamp is detected. In detail, the processor 190 may continuously generate the first blind spot video using the front view video and the first side view video and may display the first blind spot video on the first pillar display module 163.

Meanwhile, in operation 619, the electronic device 100 may detect the second user input for turning off the left turn signal lamp. In detail, if the user manipulates the lever 200 to turn off the left turn signal lamp, the interface module 140 may generate the second user input and may transmit the second user input to the processor 190. Therefore, the processor 190 may detect the second user input through the interface module 140.

In response thereto, in operation 621, the electronic device 100 may deactivate the first pillar display module 163. In detail, in a state in which the first pillar display module 163 is activated and the second pillar display module 165 is deactivated, the processor 190 may deactivate the first pillar display module 163. Through this, while the left turn signal lamp and the right turn signal lamp are turned off, the first pillar display module 163 and the second pillar display module 165 may be maintained in a deactivated state.

Meanwhile, in operation 631, the electronic device 100 may detect the first user input for turning on the right turn signal lamp. In detail, if the user manipulates the lever 200 to turn on the right turn signal lamp, the interface module 140 may generate the first user input and may transmit the first user input to the processor 190. Therefore, the processor 190 may detect the first user input through the interface module 140.

In response thereto, in operation 633, the electronic device 100 may activate the second pillar display module 165. In detail, in a state in which the first pillar display module 163 and the second pillar display module 165 are deactivated, the processor 190 may activate the second pillar display module 165. Through this, while the right turn signal lamp is turned on, the first pillar display module 163 may be maintained in a deactivated state and the second pillar display module 165 may be maintained in an activated state.

Then, in operation 635, the electronic device 100 may generate a second blind spot video using the front view video and a second side view video. In detail, the processor 190 may acquire the front view video and the second side view video from the front camera module 371 and the second side camera module 375, respectively. Here, the processor 190 may correct each of the front view video and the second side view video through camera calibration. Here, the processor 190 may remove distortion for each of the front view video and the second side view video. Then, the processor 190 may generate the second blind spot video by synthesizing the front view video and the second side view video. Here, configuration information that includes locations and dimensions of the pillar display modules 163 and 165 in the vehicle may be stored in the memory 180. In more detail, the processor 190 may synthesize the front view video and the second side view video into a single video and may detect the second blind spot video by cropping the corresponding single video based on the configuration information.

Then, in operation 637, the electronic device 100 may display the second blind spot video on the second pillar display module 165. In detail, the processor 190 may resize the second blind spot video in correspondence to a display area of the second pillar display module 165 and then may display the same on the second pillar display module 165.

Then, in operation 639, the electronic device 100 may repeat operations 635 and 637 until the second user input for turning off the right turn signal lamp is detected. In detail, the processor 190 may continuously generate the second blind spot video using the front view video and the second side view video and may display the second blind spot video on the second pillar display module 165.

Meanwhile, in operation 639, the electronic device 100 may detect the second user input for turning off the right turn signal lamp. In detail, if the user manipulates the lever 200 to turn off the right turn signal lamp, the interface module 140 may generate the second user input and may transmit the second user input to the processor 190. Therefore, the processor 190 may detect the second user input through the interface module 140.

In response thereto, in operation 641, the electronic device 100 may deactivate the second pillar display module 165. In detail, in a state in which the first pillar display module 163 is deactivated and the second pillar display module 165 is activated, the processor 190 may deactivate the second pillar display module 165. Through this, while the left turn signal lamp and the right turn signal lamp are turned off, the first pillar display module 163 and the second pillar display module 165 may be maintained in a deactivated state.

According to the example embodiment, while the turn signal lamp, that is, one of the left turn signal lamp and the right turn signal lamp is turned on, the electronic device 100 may display the blind spot video on one of the pillar display modules 163 and 165. In detail, while the vehicle is turning left, the processor 190 may display the first blind spot video on the first pillar display module 163. Alternatively, while the vehicle is turning right, the processor 190 may display the second blind spot video on the second pillar display module 165.

As described above, in the electronic device 100 according to the second example embodiments, the camera modules 170 may be provided to the front pillars on the outside of the vehicle, respectively. The camera modules 170 may include the first camera module 473 provided to the front pillar on the left of the vehicle and configured to capture the first video and the second camera module 475 provided to the front pillar on the right of the vehicle and configured to capture the second video. Example embodiments regarding an operating method of this electronic device 100 are described with reference to FIGS. 7 and 8.

Figure 7:
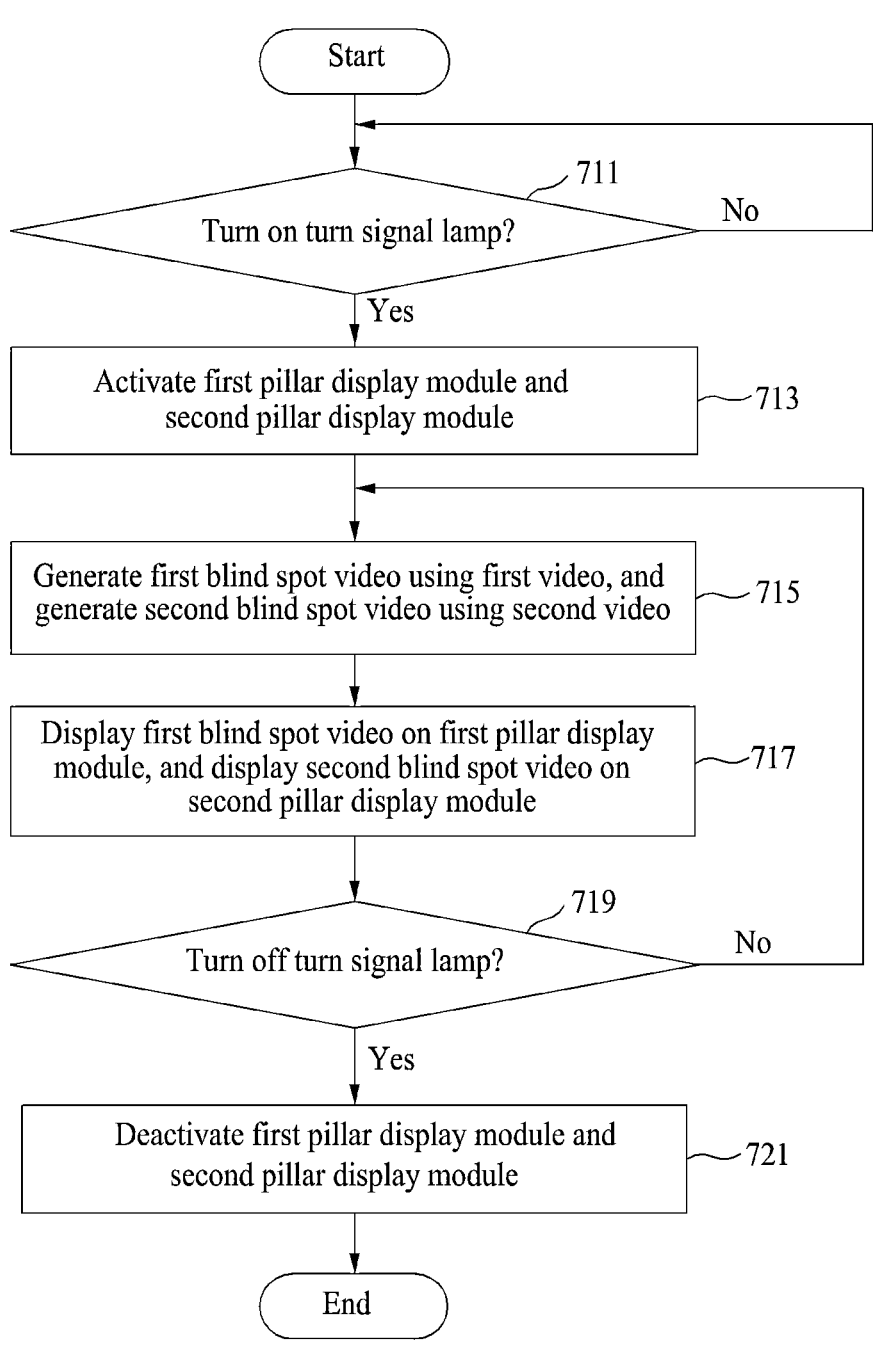
FIG. 7 is a flowchart illustrating an operating method of an electronic device according to an example embodiment among the second example embodiments.

FIG. 7 is a flowchart illustrating an operating method of the electronic device 100 according to an example embodiment among the second example embodiments.

Referring to FIG. 7, in operation 711, the electronic device 100 may detect a first user input for turning on a turn signal lamp. In detail, if the user manipulates the lever 200 to turn on the turn signal lamp, that is, one of a left turn signal lamp and a right turn signal lamp, the interface module 140 may generate the first user input and may transmit the first user input to the processor 190. Therefore, the processor 190 may detect the first user input through the interface module 140.

In response thereto, in operation 713, the electronic device 100 may activate all of the pillar display modules 163 and 165. In detail, in a state in which the first pillar display module 163 and the second pillar display module 165 are deactivated, the processor 190 may activate the first pillar display module 163 and the second pillar display module 165. Through this, while the turn signal lamp, that is, one of the left turn signal lamp and the right turn signal lamp is turned on, the first pillar display module 163 and the second pillar display module 165 may be maintained in an activated state. Here, in a state in which the first camera module 473 and the second camera module 475 are deactivated, the processor 190 may also activate the first camera module 473 and the second camera module 475. Through this, while the turn signal lamp, that is, one of the left turn signal lamp and the right turn signal lamp is turned on, the first camera module 473 may be maintained in an activated state.

Then, in operation 715, the electronic device 100 may generate blind spot videos using videos from the first camera module 473 and the second camera module 475. In detail, the processor 190 may acquire a first video from the first camera module 473 and may acquire a second video from the second camera module 473. Here, configuration information that includes locations and dimensions of the pillar display modules 163 and 165 in the vehicle may be stored in the memory 180. In more detail, the processor 190 may detect a first blind spot video by cropping the first video based on the configuration information. Similarly, the processor 190 may detect a second blind spot video by cropping the second video based on the configuration information.

Then, in operation 717, the electronic device 100 may display the blind spot videos on the pillar display modules 163 and 165, respectively. In detail, the processor 190 may display the first blind spot video on the first pillar display module 163 and may display the second blind spot video on the second pillar display module 165. In more detail, the processor 190 may resize the first blind spot video in correspondence to a display area of the first pillar display module 163 and may display the same on the first pillar display module 163. Similarly, the processor 190 may resize the second blind spot video in correspondence to a display area of the second pillar display module 165 and may display the same on the second pillar display module 165.

Then, in operation 719, the electronic device 100 may repeat operations 715 and 717 until a second user input for turning off the turn signal lamp is detected. In detail, the processor 190 may continuously generate the blind spot videos using the videos from the first camera module 473 and the second camera module 475, and may display the blind spot videos on the pillar display modules 163 and 165, respectively.

Meanwhile, in operation 719, the electronic device 100 may detect the second user input for turning off the turn signal lamp. In detail, if the user manipulates the lever 200 to turn off the turn signal lamp, that is, one of the left turn signal lamp and the right turn signal lamp, the interface module 140 may generate the second user input and may transmit the second user input to the processor 190. Therefore, the processor 190 may detect the second user input through the interface module 140.

In response thereto, in operation 721, the electronic device 100 may deactivate all of the pillar display modules 163 and 165. In detail, in a state in which the first pillar display module 163 and the second pillar display module 165 are activated, the processor 190 may deactivate the first pillar display module 163 and the second pillar display module 165. Through this, while the turn signal lamp, that is, the left turn signal lamp and the right turn signal lamp are turned off, the first pillar display module 163 and the second pillar display module 165 may be maintained in a deactivated state. Here, in a state in which the first camera module 473 and the second camera module 475 are activated, the processor 190 may deactivate the first camera module 473 and the second camera module 475. Through this, while the turn signal lamp, that is, the left turn signal lamp and the right turn signal lamp are turned off, the first camera module 473 and the second camera module 475 may also be maintained in a deactivated state.

According to the example embodiment, while the turn signal lamp, that is, one of the left turn signal lamp and the right turn signal lamp is turned on, the electronic device 100 may display the blind spot videos on the pillar display modules 163 and 165. In detail, while the vehicle is turning left, the processor 190 may display the second blind spot video on the second pillar display module 165 with displaying the first blind spot video on the first pillar display module 163. Alternatively, while the vehicle is turning right, the processor 190 may display the second blind spot video on the second pillar display module 165 with displaying the first blind spot video on the first pillar display module 163.

Figure 8:
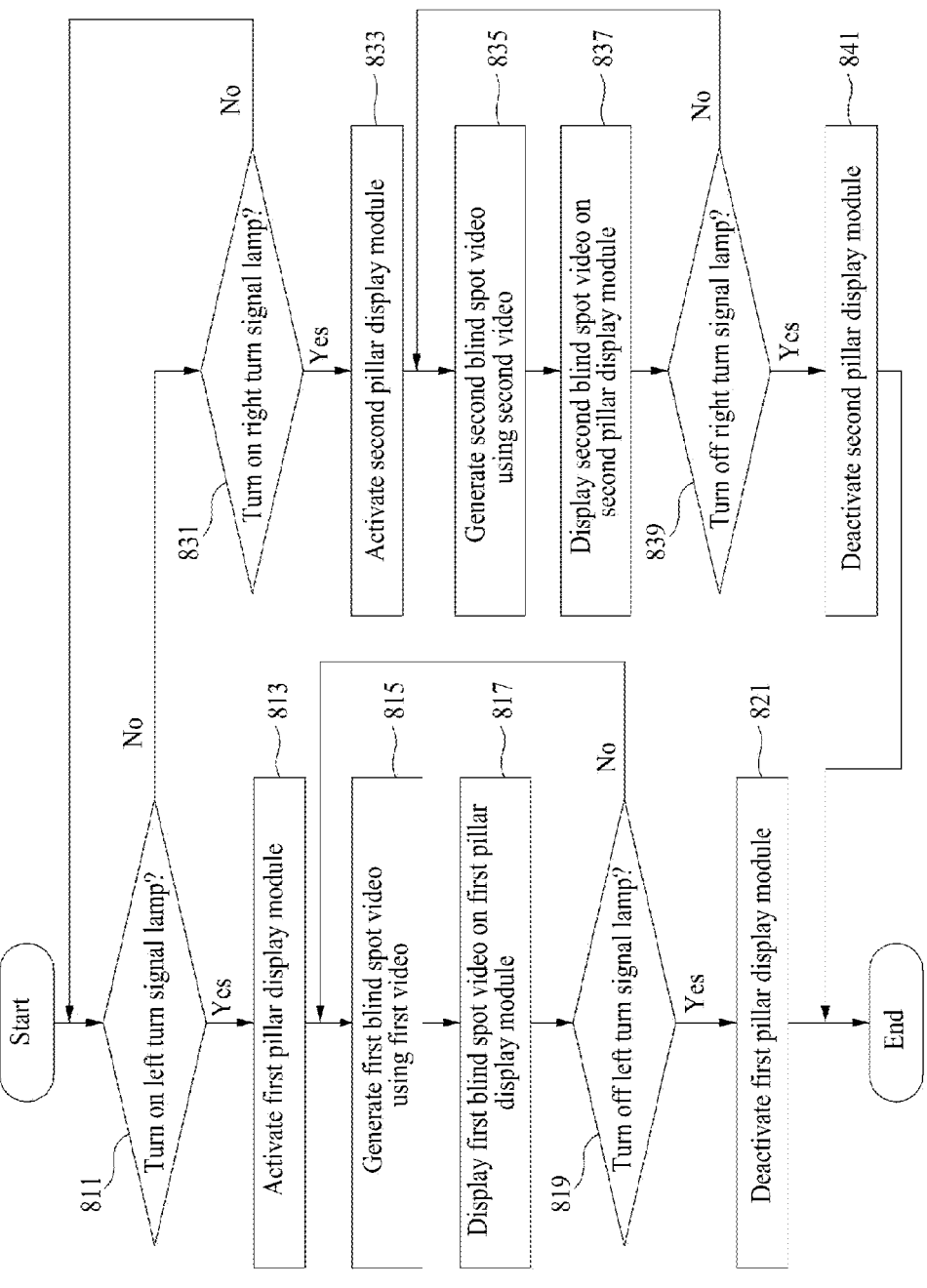
FIG. 8 is a flowchart illustrating an operating method of an electronic device according to another example embodiment among the second example embodiments.

FIG. 8 is a flowchart illustrating an operating method of the electronic device 100 according to another example embodiment among the second example embodiments.

Referring to FIG. 8, in operation 811, the electronic device 100 may detect a first user input for turning on a left turn signal lamp. In detail, if the user manipulates the lever 200 to turn on the left turn signal lamp, the interface module 140 may generate the first user input and may transmit the first user input to the processor 190. Therefore, the processor 190 may detect the first user input through the interface module 140.

In response thereto, in operation 813, the electronic device 100 may activate the first pillar display module 163. In detail, in a state in which the first pillar display module 163 and the second pillar display module 165 are deactivate, the processor 190 may activate the first pillar display module 163. Through this, while the left turn signal lamp is turned on, the first pillar display module 163 may be maintained in an activated state and the second pillar display module 165 may be maintained in a deactivated state. Here, in a state in which the first camera module 473 and the second camera module 475 are deactivated, the processor 190 may also activate the first camera module 473. Through this, while the left turn signal lamp is turned on, the first camera module 473 may be maintained in an activated state and the second camera module 475 may be maintained in a deactivated state.

Then, in operation 815, the electronic device 100 may generate a first blind spot video using a first video from the first camera module 473. In detail, the processor 190 may acquire the first video from the first camera module 473. Here, configuration information that includes locations and dimensions of the pillar display modules 163 and 165 in the vehicle may be stored in the memory 180. In more detail, the processor 190 may detect the first blind spot video by cropping the corresponding single video based on the configuration information.

Then, in operation 817, the electronic device 100 may display the first blind spot video on the first pillar display module 163. In detail, the processor 190 may resize the first blind spot video in correspondence to a display area of the first pillar display module 163 and then display the same on the first pillar display module 163.

Then, in operation 819, the electronic device 100 may repeat operations 815 and 817 until a second user input for turning off the left turn signal lamp is detected. In detail, the processor 190 may continuously generate the first blind spot video using the first video from the first camera module 473 and may display the first blind spot video on the first pillar display module 163.

Meanwhile, in operation 819, the electronic device 100 may detect the second user input for turning off the left turn signal lamp. In detail, if the user manipulates the lever 200 to turn off the left turn signal lamp, the interface module 140 may generate the second user input and may transmit the second user input to the processor 190. Therefore, the processor 190 may detect the second user input through the interface module 140.

In response thereto, in operation 821, the electronic device 100 may deactivate first pillar display module 163. In detail, in a state in which the first pillar display module 163 is activated and the second pillar display module 165 is deactivated, the processor 190 may deactivate the first pillar display module 163. Through this, while the left turn signal lamp and the right turn signal lamp are turned off, the first pillar display module 163 and the second pillar display module 165 may be maintained in a deactivated state. Here, in a state in which the first camera module 473 is activated and the second camera module 475 is deactivated, the processor 190 may also deactivate the first camera module 473. Through this, while the left turn signal lamp and the right turn signal lamp are turned off, the first camera module 473 and the second camera module 475 may also be maintained in a deactivated state.

Meanwhile, in operation 831, the electronic device 100 may detect the first user input for turning on the right turn signal lamp. In detail, if the user manipulates the lever 200 to turn on the right turn signal lamp, the interface module 140 may generate the first user input and may transmit the first user input to the processor 190. Therefore, the processor 190 may detect the first user input through the interface module 140.

In response thereto, in operation 833, the electronic device 100 may activate the second pillar display module 165. In detail, in a state in which the first pillar display module 163 and the second pillar display module 165 are deactivated, the processor 190 may activate the second pillar display module 165. Through this, while the right turn signal lamp is turned on, the first pillar display module 163 may be maintained in a deactivated state and the second pillar display module 165 may be maintained in an activated state. Here, in a state in which the first camera module 473 and the second camera module 475 are deactivated, the processor 190 may also activate the second camera module 475. Through this, while the left turn signal lamp is turned on, the first camera module 473 may be maintained in a deactivated state and the second camera module 475 may be maintained in an activated state.

Then, in operation 835, the electronic device 100 may generate a second blind spot video using a second video from the second camera module 475. In detail, the processor 190 may acquire the second video from the second camera module 475. Here, configuration information that includes locations and dimensions of the pillar display modules 163 and 165 in the vehicle may be stored in the memory 180. In more detail, the processor 190 may detect the second blind spot video by cropping the second video based on the configuration information.

Then, in operation 837, the electronic device 100 may display the second blind spot video on the second pillar display module 165. In detail, the processor 190 may resize the second blind spot video in correspondence to a display area of the second pillar display module 165 and then may display the same on the second pillar display module 165.

Then, in operation 839, the electronic device 100 may repeat operations 835 and 837 until the second user input for turning off the right turn signal lamp is detected. In detail, the processor 190 may continuously generate the second blind spot video using the second video from the second camera module 475 and may display the second blind spot video on the second pillar display module 165.

Meanwhile, in operation 839, the electronic device 100 may detect the second user input for turning off the right turn signal lamp. In detail, if the user manipulates the lever 200 to turn off the right turn signal lamp, the interface module 140 may generate the second user input and may transmit the second user input to the processor 190. Therefore, the processor 190 may detect the second user input through the interface module 140.

In response thereto, in operation 841, the electronic device 100 may deactivate the second pillar display module 165. In detail, in a state in which the first pillar display module 163 is deactivated and the second pillar display module 165 is activated, the processor 190 may deactivate the second pillar display module 165. Through this, while the left turn signal lamp and the right turn signal lamp are turned off, the first pillar display module 163 and the second pillar display module 165 may be maintained in a deactivated state. Here, in a state in which the first camera module 473 is deactivated and the second camera module 475 is activated, the processor 190 may also deactivate the second camera module 475. Through this, while the left turn signal lamp and the right turn signal lamp are turned off, the first camera module 473 and the second camera module 475 may also be maintained in a deactivated state.

According to the example embodiment, while the turn signal lamp, that is, one of the left turn signal lamp and the right turn signal lamp is turned on, the electronic device 100 may display the blind spot video on one of the pillar display modules 163 and 165. In detail, while the vehicle is turning left, the processor 190 may display the first blind spot video on the first pillar display module 163. Alternatively, while the vehicle is turning right, the processor 190 may display the second blind spot video on the second pillar display module 165.

According to example embodiments, a blind spot obscured by front pillars of a vehicle maybe removed. That is, the electronic device 100 may display at least one of blind spot videos obscured by the front pillars of the vehicle on at least one of the pillar display modules 163 and 165 provided to the front pillars. Through this, a driver may look ahead and sides of the vehicle without the blind spot obscured by the front pillars. In particular, when the vehicle is turning, the driver may easily verify a surrounding situation of the vehicle without the blind spot. This ensures the safety of not only vehicle passengers including the driver but also pedestrians. According to the first example embodiments, since blind spot videos are generated using external videos from the camera modules 170 generally mounted to the vehicle for a surround view monitoring function, there is no need to add other camera modules. This may prevent an increase in work time, an increase in installation cost, and an increase in vehicle weight due to addition of other camera modules. According to the second example embodiments, since blind spot videos are generated using external videos from the camera modules 170 additionally mounted to the vehicle for a blind monitoring function through the pillar display modules 163 and 165, the operating load of the processor 190 may be reduced. This is because the processor 190 does not need to synthesize a plurality of external videos to generate a single blind spot video.

In short, the present disclosure provides the electronic device 100 for providing a blind spot video through a front pillar of a vehicle and an operating method of the same.

In the present disclosure, the electronic device 100 mounted to a vehicle may include at least two camera modules 170 configured to capture external videos of the vehicle, respectively, the pillar display modules 163 and 165 provided to front pillars of the vehicle inside the vehicle, respectively, and the processor 190 configured to connect to the camera modules 170 and the pillar display modules 163 and 165, and to display at least one of blind spot videos that are obscured by the front pillars on at least one of the pillar display modules 163 and 165 using at least one of the external videos.

According to various example embodiments, the processor 190 may be configured to activate at least one of the pillar display modules 163 and 165 in response to a first user input, and to deactivate at least one of the pillar display modules 163 and 165 in response to a second user input.

According to various example embodiments, the first user input may be to turn on one of a left turn signal lamp and a right turn signal lamp of the vehicle, and the second user input may be to turn off one of the left turn signal lamp and the right turn signal lamp.

According to various example embodiments, the pillar display modules 163 and 165 may include the first pillar display module 163 provided to a front pillar on the left inside the vehicle, and the second pillar display module 165 provided to a front pillar on the right inside the vehicle.

According to the first example embodiments, the camera modules 170 may include the front camera module 371 configured to capture a front view video of the vehicle, the first side camera module 373 configured to capture a first side view video on the left of the vehicle, and the second side camera module 375 configured to capture a second side view video on the right of the vehicle.

According to the first example embodiments, the processor 190 may be configured to synthesize the front view video and the first side view video, and detect a first blind spot video to display on the first pillar display module 163, and to synthesize the front view video and the second side view video, and detect a second blind spot video to display on the second pillar display module 165.

According to the second example embodiments, the camera modules 170 may include the first camera module 473 and the second camera module 475 provided to the front pillars, respectively, on the outside of the vehicle.

According to the second example embodiments, the processor 190 may be configured to detect a first blind spot video to display on the first pillar display module 163 in a video from the first camera module 473, and to detect a second blind spot video to display on the second pillar display module 165 in a video from the second camera module 475.

According to some example embodiments, the processor 190 may be configured to activate the first pillar display module 163 in response to the first user input for turning on a left turn signal lamp of the vehicle and deactivate the first pillar display module 163 in response to the second user input for turning off the left turn signal lamp, and to activate the second pillar display module 165 in response to the first user input for turning on a right turn signal lamp of the vehicle and deactivate the second pillar display module 165 in response to the second user input for turning off the right turn signal lamp.

According to various example embodiments, the processor 190 may be configured to detect the blind spot videos in the external videos based on configuration information that includes locations and dimensions of the pillar display modules 163 and 165 in the vehicle.

In the present disclosure, an operating method of the electronic device 100 mounted to a vehicle may include detecting at least one of blind spot videos that are obscured by front pillars of the vehicle using at least one external video of the vehicle (operations 515, 615, 635, 715, 815, and 835), and displaying at least one of the blind spot videos through at least one of the pillar display modules 163 and 165 provided to the front pillars, respectively (operations 517, 617, 637, 717, 817, and 837).

According to various example embodiments, the operating method of the electronic device 100 may further include activating at least one of the pillar display modules 163 and 165 in response to a first user input (operations 513, 613, 633, 713, 813, and 833).

According to various example embodiments, the displaying the at least one of the blind spot videos (operations 515, 615, 635, 715, 815, and 835) and the displaying the at least one of the blind spot videos (operations 513, 613, 633, 713, 813, and 833) may be repeated while at least one of the pillar display modules 163 and 165 is activated.

According to various example embodiments, the operating method of the electronic device 100 may further include deactivating at least one of the pillar display modules 163 and 165 in response to a second user input (operations 521, 621, 641, 721, 821, and 841).

According to various example embodiments, the first user input may be to turn on one of a left turn signal lamp and a right turn signal lamp of the vehicle, and the second user input may be to turn off one of the left turn signal lamp and the right turn signal lamp.

According to various example embodiments, the pillar display modules 163 and 165 may include the first pillar display module 163 provided to a front pillar on the left inside the vehicle, and the second pillar display module 165 provided to a front pillar on the right inside the vehicle.

According to the first example embodiments, the electronic device 100 may include the front camera module 371 configured to capture a front view video of the vehicle, the first side camera module 373 configured to capture a first side view video on the left of the vehicle, and the second side camera module 375 configured to capture a second side view video on the right of the vehicle.

According to the first example embodiments, the detecting the at least one of the blind spot videos (operations 515, 615, and 635) may include at least one of synthesizing the front view video and the first side view video, and detecting a first blind spot video to display on the first pillar display module 163, and synthesizing the front view video and the second side view video, and detecting a second blind spot video to display on the second pillar display module 165.

According to the second example embodiments, the electronic device 100 may include the first camera module 473 and the second camera module 475 provided to the front pillars, respectively, on the outside of the vehicle.

According to the second example embodiments, the detecting the at least one of the blind spot videos (operations 715, 815, and 835) may include at least one of detecting a first blind spot video to display on the first pillar display module 163 in a video from the first camera module 473, and detecting a second blind spot video to display on the second pillar display module 165 in a video from the second camera module 475.

According to some example embodiments, the activating the at least one of the pillar display modules 163 and 165 (operations 613, 633, 813, and 833) may include activating the first pillar display module 163 in response to the first user input for turning on a left turn signal lamp of the vehicle (operation 613 and 813), or activating the second pillar display module 165 in response to the first user input for turning on a right turn signal lamp of the vehicle (operations 633 and 833).

According to some example embodiments, the deactivating the at least one of the pillar display modules 163 and 165 (operations 621, 641, 821, and 841) may include deactivating the first pillar display module 163 in response to the second user input for turning off the left turn signal lamp (operations 621 and 821) or deactivating the second pillar display module 165 in response to the second user input for turning off the right turn signal lamp (operations 641 and 841)

According to various example embodiments, the detecting at least one of the blind spot videos (operations 515, 615, 635, 715, 815, and 835) may include detecting at least one of the blind spot videos in the external videos based on configuration information that includes locations and dimensions of the pillar display modules 163 and 165 in the vehicle.

In the present disclosure, the electronic device 100 mounted to a vehicle may include the front camera module 371 configured to capture a front view video of the vehicle, the first side camera module 373 configured to capture a first side view video on the left of the vehicle, and the second side camera module 375 configured to capture a second side view video on the right of the vehicle, and the rear camera module 377 configured to capture a rear view video of the vehicle, the pillar display modules 163 and 165 provided to front pillars of the vehicle inside the vehicle, respectively, the main display module 160 mounted inside the vehicle separate from the pillar display modules 163 and 165, and the processor 190 configured to connect to the front camera module 371, the side camera modules 373 and 375, the rear camera module 377, the main display module 160, and the pillar display modules 163 and 165, and to display a surround view video on the main display module 160 using the front view video, the side view videos, and the rear view video, and to display at least one of blind spot videos that are obscured by the front pillars on at least one of the pillar display modules 163 and 165 using at least one of the front view video and the side view videos.

According to various example embodiments, the processor 190 may be configured to synthesize the surround view video by synthesizing the front view video, the side view videos, and the rear view video in response to a user input that requests the surround view video.

In the present disclosure, an operating method of the electronic device 100 mounted to a vehicle may include capturing a front view video, side view videos, and a rear view video of the vehicle, displaying a surround view video on the main display module 160 using the front view video, the side view videos, and the rear view video in response to a user input, and activating at least one of the pillar display modules 163 and 165 provided to front pillars, respectively, and displaying at least one of blind spot videos that are obscured by the front pillars on at least one of the pillar display modules 163 and 165 using at least one of the front view video and side view videos, in response to the user input.

Figure 9:
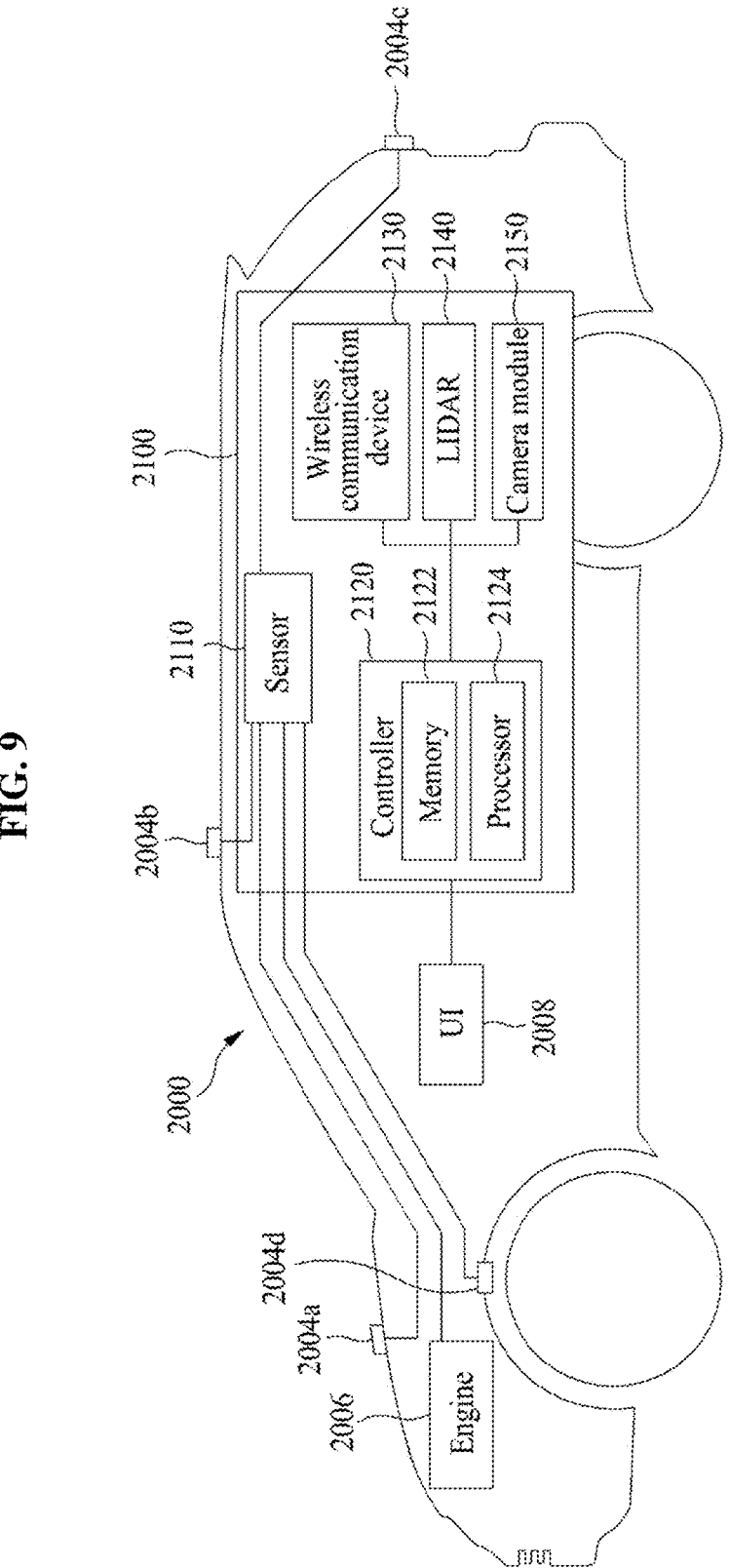
FIG. 9 is a block diagram illustrating a vehicle to which an electronic device is mounted according to various example embodiments is mounted.
Figure 10:
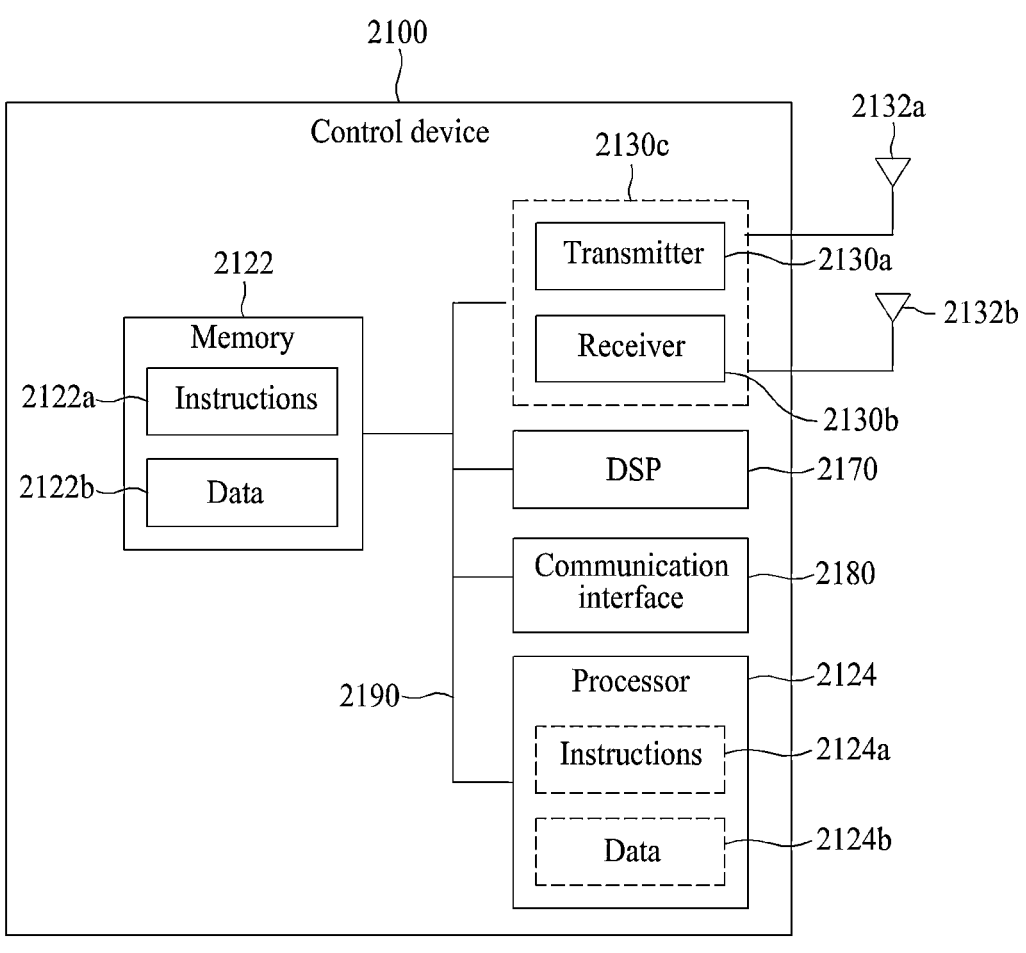
FIG. 10 is a block diagram illustrating a control device of the vehicle of FIG. 9.

FIG. 9 is a block diagram illustrating a vehicle 2000 to which the electronic device 100 is mounted according to various example embodiments. FIG. 10 is a block diagram illustrating a control device 2100 of the vehicle of FIG. 9.

Referring to FIGS. 9 and 10, the electronic device 100 according to various example embodiments may be mounted to the vehicle 2000 and the vehicle 2000 may include the control device 2100. Here, the vehicle 2000 may be an autonomous vehicle. In some example embodiments, at least one component of the electronic device 100 may be integrated into at least one component of the control device 2100.

The control device 2100 may include a controller 2120 that includes a memory 2122 and a processor 2124, a sensor 2110, a wireless communication device 2130, a light detection and ranging (LIDAR) device 2140, and a camera module 2150.

The controller 2120 may be configured at a time of manufacture by a manufacturing company of the vehicle or may be additionally configured to perform an autonomous driving function after manufacture. Alternatively, a configuration to continuously perform an additional function by upgrading the controller 2120 configured at the time of manufacture may be included.

The controller 2120 may forward a control signal to the sensor 2110, an engine 2006, a user interface (UI) 2008, the wireless communication device 2130, the LIDAR device 2140, and the camera module 2150 included as other components in the vehicle. Also, although not illustrated, the controller 2120 may forward a control signal to an acceleration device, a braking system, a steering device, or a navigation device associated with driving of the vehicle.

The controller 2120 may control the engine 2006. For example, the controller 2120 may sense a speed limit of a road on which the vehicle 2000 is driving and may control the engine 2006 such that a driving speed may not exceed the speed limit, or may control the engine 2006 to increase the driving speed of the vehicle 2000 within the range of not exceeding the speed limit. Additionally, when sensing modules 2004a, 2004b, 2004c, and 2004d sense an external environment of the vehicle and forward the same to the sensor 2110, the controller 2120 may receive external environment information, may generate a signal for controlling the engine 2006 or a steering device (not shown), and thereby control driving of the vehicle.

When another vehicle or an obstacle is present in front of the vehicle, the controller 2120 may control the engine 2006 or the braking system to decrease the driving speed and may also control a trajectory, a driving route, and a steering angle in addition to the speed. Alternatively, the controller 2120 may generate a necessary control signal according to recognition information of other external environments, such as, for example, a driving lane, a driving signal, etc., of the vehicle, and may control driving of the vehicle.

The controller 2120 may also control driving of the vehicle by communicating with a nearby vehicle or a central server in addition to autonomously generating the control signal and by transmitting an instruction for controlling peripheral devices based on the received information.

Further, if a location or an angle of view of the camera module 2150 is changed, it may be difficult for the controller 2120 to accurately recognize a vehicle or a lane. To prevent this, the controller 2120 may generate a control signal for controlling a calibration of the camera module 2150. Therefore, the controller 2120 may generate a calibration control signal for the camera module 2150 and may continuously maintain a normal mounting location, direction, angle of view, etc., of the camera module 2150 regardless of a change in a mounting location of the camera module 2150 by a vibration or an impact occurring due to a motion of the autonomous vehicle 2000. When prestored information on an initial mounting location, direction, and angle of view of the camera module 2150 differs from information on the initial mounting location, direction, and angle of view of the camera module 2150 that are measured during driving of the autonomous vehicle 2000 by a threshold or more, the controller 2120 may generate a control signal for performing calibration of the camera module 2150.

The controller 2120 may include the memory 2122 and the processor 2124. The processor 2124 may execute software stored in the memory 2122 in response to the control signal of the controller 2120. In detail, the controller 2120 may store, in the memory 2122, data and instructions for detecting a visual field view from a rear view video of the vehicle 2000, and the instructions may be executed by the processor 2124 to perform one or more methods disclosed herein.

Here, the memory 2122 may be stored in a recording medium executable at the non-volatile processor 2124. The memory 2122 may store software and data through an appropriate external device. The memory 2122 may include random access memory (RAM), read only memory (ROM), hard disk, and a memory device connected to a dongle.

The memory 2122 may at least store an operating system (OS), a user application, and executable instructions. The memory 2122 may store application data and arrangement data structures.

The processor 2124 may be a controller, a microcontroller, or a state machine as a microprocessor or an appropriate electronic processor.

The processor 2124 may be configured as a combination of computing devices. The computing device may be configured as a digital signal processor, a microprocessor, or an appropriate combination thereof.

Also, the control device 2100 may monitor internal and external features of the vehicle 2000 and may detect a state of the vehicle 2000 using at least one sensor 2110.

The sensor 2110 may include at least one sensing module 2004. The sensing module 2004 may be implemented at a specific location of the vehicle 2000 depending on a sensing purpose. The sensing module 2004 may be provided in a lower portion, a rear end, a front end, an upper end, or a side end of the vehicle 2000 and may be provided to an internal part of the vehicle, a tier, and the like.

Through this, the sensing module 2004 may sense driving information, such as the engine 2006, a tier, a steering angle, a speed, a vehicle weight, and the like, as internal vehicle information. Also, the at least one sensing module 2004 may include an acceleration sensor (2110), a gyroscope, an image sensor (2110), a radar, an ultrasound sensor, a LIDAR sensor, and the like, and may sense motion information of the vehicle 2000.

The sensing module 2004 may receive specific data, such as state information of a road on which the vehicle 2000 is present, nearby vehicle information, and an external environmental state such as weather, as external information, and may sense a vehicle parameter according thereto. The sensed information may be stored in the memory 2122 temporarily or in long-term depending on purposes.

The sensor 2110 may integrate and collect information of the sensing modules 2004 for collecting information generated inside and on outside the vehicle 2000.

The control device 2100 may further include the wireless communication device 2130.

The wireless communication device 2130 is configured to implement wireless communication between the vehicles 2000. For example, the wireless communication device 2130 enables the vehicles 2000 to communicate with a mobile phone of a user, another wireless communication device 2130, another vehicle, a central device (traffic control device), a server, and the like. The wireless communication device 2130 may transmit and receive a wireless signal according to a connection communication protocol. A wireless communication protocol may be WiFi, Bluetooth, Long-Term Evolution (LTE), code division multiple access (CDMA), wideband code division multiple access (WCDMA), and global systems for mobile communications (GSM). However, it is provided as an example only and the wireless communication protocol is not limited thereto.

Also, the vehicle 2000 may implement vehicle-to-vehicle (V2V) communication through the wireless communication device 2130. That is, the wireless communication device 2130 may perform communication with another vehicle and other vehicles on the roads through the V2V communication. The vehicle 2000 may transmit and receive information, such as driving warnings and traffic information, through the V2V communication and may also request another vehicle for information or may receive a request from the other vehicle. For example, the wireless communication device 2130 may perform the V2V communication using a dedicated short-range communication (DSRC) device or a cellular-V2V (CV2V) device. Also, in addition to the V2V communication, vehicle-to-everything (V2X) communication, communication between the vehicle and another object (e.g., electronic device carried by pedestrian), may be implemented through the wireless communication device 2130.

Also, the control device 2100 may include the LIDAR device 2140. The LIDAR device 2140 may detect an object around the vehicle 2000 during an operation, based on data sensed using a LIDAR sensor. The LIDAR device 2140 may transmit detection information to the controller 2120, and the controller 2120 may operate the vehicle 2000 based on the detection information. For example, when the detection information includes a vehicle ahead driving at a low speed, the controller 2120 may instruct the vehicle to decrease a speed through the engine 2006. Alternatively, the controller 2120 may instruct the vehicle to decrease a speed based on a curvature of a curve the vehicle enters.

The control device 2100 may further include the camera module 2150. The controller 2120 may extract object information from an external image captured from the camera module 2150, and may process the extracted object information using the controller 2120.

Also, the control device 2100 may further include imaging devices configured to recognize an external environment. In addition to the LIDAR device 2140, a radar, a GPS device, a driving distance measurement device (odometry), and other computer vision devices may be used. Such devices may selectively or simultaneously operate depending on necessity, thereby enabling further precise sensing.

The vehicle 2000 may further include the user interface (UI) 2008 for a user input to the control device 2100. The user interface 2008 enables the user to input information through appropriate interaction. For example, the user interface 2008 may be configured as a touchscreen, a keypad, and a control button. The user interface 2008 may transmit an input or an instruction to the controller 2120, and the controller 2120 may perform a vehicle control operation in response to the input or the instruction.

Also, the user interface 2008 may enable communication between an external device of the vehicle 2000 and the vehicle 2000 through the wireless communication device 2130. For example, the user interface 2008 may enable interaction with a mobile phone, a tablet, or other computer devices.

Further, although the example embodiment describes that the vehicle 2000 includes the engine 2006, it is provided as an example only. The vehicle 2000 may include a different type of a propulsion system. For example, the vehicle 2000 may run with electric energy, and may run with hydrogen energy or through a hybrid system with a combination thereof. Therefore, the controller 2120 may include a propulsion mechanism according to the propulsion system of the vehicle 2000 and may provide a control signal according thereto to each component of the propulsion mechanism.

Hereinafter, a configuration of the control device 2100 for providing blind spot videos through front pillars of the vehicle 2000 is described with reference to FIG. 10.

The control device 2100 may include the processor 2124. The processor 2124 may be a general-purpose single or multi-chip microprocessor, a dedicated microprocessor, a microcontroller, a programmable gate array, and the like. The processor 2124 may also be referred to as a central processing unit (CPU). Also, the processor 2124 may be a combination of a plurality of processors.

The control device 2100 also includes the memory 2122. The memory 2122 may be any electronic component capable of storing electronic information. The memory 2122 may include a combination of memories 2122 in addition to a unit memory.

According to various example embodiments, data 2122*b* and instructions 2122*a* for providing blind spot videos through front pillars of the vehicle 2000 may be stored in the memory 2122. When the processor 2124 executes the instructions 2122*a*, the instructions 2122*a* and a portion or all of the data 2122*b* required to perform command may be loaded to the processor 2124 (2124*a* and 2124*b*).

The control device 2100 may include a transmitter 2130*a* and a receiver 2130*b*, or a transceiver 2130*c*, to allow transmission and reception of signals. One or more antennas 2132*a* and 2132*b* may be electrically connected to the transmitter 2130*a* and the receiver 2130*b*, or the transceiver 2130*c*, and may include additional antennas.

The control device 2100 may include a digital signal processor (DSP) 2170, and may control the vehicle to quickly process a digital signal through the DSP 2170.

The control device 2100 may also include a communication interface 2180. The communication interface 2180 may include one or more ports and/or communication modules configured to connect other devices to the control device 2100. The communication interface 2180 may enable interaction between the user and the control device 2100.

Various components of the control device 2100 may be connected through one or more buses 2190, and the buses 2190 may include a power bus, a control signal bus, a state signal bus, and a database bus. The components may forward mutual information through the buses 2190 under control of the processor 2124 and may perform desired functions.

The apparatuses described herein may be implemented using hardware components, software components, and/or a combination of the hardware components and the software components. For example, the apparatuses and the components described herein may be implemented using one or more general-purpose or special purpose computers, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that the processing device may include multiple processing elements and/or multiple types of processing elements. For example, the processing device may include multiple processors or a processor and a controller. In addition, other processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, computer storage medium or device, to provide instructions or data to the processing device or be interpreted by the processing device. The software also may be distributed over network coupled computer systems so that the software is stored and executed in a distributed fashion. The software and data may be stored by one or more computer readable storage mediums.

The methods according to various example embodiments may be implemented in a form of a program instruction executable through various computer methods and recorded in computer-readable media. Here, the media may be to continuously store a computer-executable program or to temporarily store the same for execution or download. The media may be various types of record methods or storage methods in which a single piece of hardware or a plurality of pieces of hardware are combined and may be distributed over a network without being limited to a medium that is directly connected to a computer system. Examples of the media include magnetic media such as hard disks, floppy disks, and magnetic tapes; optical media such as CD ROM and DVD; magneto-optical media such as floptical disks; and hardware devices that are specially configured to store and perform program instructions, such as read-only memory (ROM), random access memory (RAM), flash memory, and the like. Examples of other media may include recording media and storage media managed by an app store that distributes applications or a site, a server, and the like that supplies and distributes other various types of software.

Various example embodiments and the terms used herein are not construed to limit description disclosed herein to a specific implementation and should be understood to include various modifications, equivalents, and/or substitutions of a corresponding example embodiment. In the drawings, like reference numerals refer to like components throughout the present specification. The singular forms "a," "an," and "the" are intended to include the plural forms as well, unless the context clearly indicates otherwise. Herein, the expressions, "A or B," "at least one of A and/or B," "A, B, or C," "at least one of A, B, and/or C," and the like may include any possible combinations of listed items. Terms "first," "second," etc., are used to describe corresponding components regardless of order or importance and the terms are simply used to distinguish one component from another component. The components should not be limited by the terms. When a component (e.g., first component) is described to be "(functionally or communicatively) connected to" or "accessed to" another component (e.g., second component), the component may be directly connected to the other component or may be connected through still another component (e.g., third component).

The term "module" used herein may include a unit configured as hardware, software, or firmware, and may be interchangeably used with the terms, for example, "logic," "logic block," "part," "circuit," etc. The module may be an integrally configured part, a minimum unit that performs one or more functions, or a portion thereof. For example, the module may be configured as an application-specific integrated circuit (ASIC).

According to various example embodiments, each of the components (e.g., module or program) may include a singular object or a plurality of objects. According to various example embodiments, at least one of the components or operations may be omitted. Alternatively, at least one another component or operation may be added. Alternatively or additionally, a plurality of components (e.g., modules or programs) may be integrated into a single component. In this case, the integrated component may perform one or more functions of each of the components in the same or similar manner as it is performed by a corresponding component before integration. According to various example embodiments, operations performed by a module, a program, or another component may be performed in a sequential, parallel, iterative, or heuristic manner. Alternatively, at least one of the operations may be performed in different sequence or omitted. Alternatively, at least one another operation May be added.

What is claimed is:

1. An electronic device mounted to a vehicle, the electronic device comprising:
  a front camera module configured to capture a front view video of the vehicle and side camera modules configured to capture side view videos of the vehicle, respectively;
  pillar display modules provided to front pillars of the vehicle inside the vehicle, respectively; and
  a processor configured to connect to the front camera module, the side camera modules, and the pillar display modules,
  wherein the processor is configured to
  synthesize the front view video and at least one of the side view videos to generate a synthesized video,
  detect at least one of blind spot videos that are obscured by the front pillars by cropping the synthesized video based on setting information including locations and dimensions of the pillar display modules, and
  display the detected at least one of blind spot videos on at least one of the pillar display modules,
  wherein the processor is configured to,
  activate the at least one of the pillar display modules to display the at least one of blind spot videos in response to a first user input to turn on a turn signal lamp of the vehicle, and
  deactivate the at least one of the pillar display modules to disable display of the at least one of blind spot videos in response to a second user input to turn off the turn signal lamp, and
  wherein the processor is configured to display reference information including a distance to an adjacent vehicle relative to the vehicle and/or a speed of the adjacent vehicle, detected based on an analysis result of the front view video and/or the at least one of the side view videos, together with the detected at least one of blind spot videos on the at least one of the pillar display modules.

2. The electronic device of claim 1, wherein the first user input is to turn on one of a left turn signal lamp and a right turn signal lamp as the turn signal lamp, and
  the second user input is to turn off said one of the left turn signal lamp and the right turn signal lamp.

3. The electronic device of claim 1, wherein the pillar display modules include:
  a first pillar display module provided to a front pillar on the left inside the vehicle; and
  a second pillar display module provided to a front pillar on the right inside the vehicle.

4. The electronic device of claim 3, wherein the side camera modules include:
  a first side camera module configured to capture a first side view video on the left of the vehicle as one of the side view videos; and
  a second side camera module configured to capture a second side view video on the right of the vehicle as the other one of the side view videos.

5. The electronic device of claim 4, wherein the processor is configured to,
  synthesize the front view video and the first side view video, and detect a first blind spot video to display on the first pillar display module based on the setting information including locations and dimensions of the first pillar display module, and
  synthesize the front view video and the second side view video, and detect a second blind spot video to display on the second pillar display module based on the setting information including locations and dimensions of the second pillar display module.

6. The electronic device of claim 3, wherein the processor is configured to,
  activate the first pillar display module in response to the first user input for turning on the turn signal lamp indicating left and deactivate the first pillar display module in response to the second user input for turning off the turn signal lamp indicating left, and
  activate the second pillar display module in response to the first user input for turning on the turn signal lamp indicating right and deactivate the second pillar display module in response to the second user input for turning off the turn signal lamp indicating right.

7. The electronic device of claim 1, wherein the processor is configured to activate, in response to the first user input to turn on the turn signal lamp indicating a first direction, one of the pillar display modules corresponding to the first direction to display the blind spot video for the first direction of the vehicle, and the first direction is left or right.

8. An operating method of an electronic device mounted to a vehicle, the method comprising:
  synthesizing a front view video of the vehicle and at least one of side view videos of the vehicle to generate a synthesized video;
  detecting at least one of blind spot videos that are obscured by front pillars of the vehicle by cropping the synthesized video based on setting information including locations and dimensions of pillar display modules provided to the front pillars, respectively; and
  displaying the detected at least one of blind spot videos through at least one of the pillar display modules,
  wherein the displaying comprises activating the at least one of the pillar display modules to display the at least one of blind spot videos in response to a first user input to turn on a turn signal lamp of the vehicle, and deactivating the at least one of the pillar display modules to disable display of the at least one of blind spot videos in response to a second user input to turn off the turn signal lamp, and wherein the displaying comprises displaying reference information including a distance to an adjacent vehicle relative to the vehicle and/or a speed of the adjacent vehicle, detected based on an analysis result of the front view video and/or the at least one of the side view videos, together with the detected at least one of blind spot videos through the at least one of the pillar display modules.

9. The method of claim 8, wherein the detecting the at least one of the blind spot videos and the displaying the at least one of the blind spot videos is repeated while at least one of the pillar display modules is activated.

10. The method of claim 8, wherein the first user input is to turn on one of a left turn signal lamp and a right turn signal lamp as the turn signal lamp, and the second user input is to turn off said one of the left turn signal lamp and the right turn signal lamp.

11. The method of claim 8, wherein the pillar display modules include:

a first pillar display module provided to a front pillar on the left inside the vehicle; and a second pillar display module provided to a front pillar on the right inside the vehicle.

12. The method of claim 11, wherein the electronic device includes:

a front camera module configured to capture the front view video of the vehicle;

a first side camera module configured to capture a first side view video on the left of the vehicle as one of the side view videos; and a second side camera module configured to capture a second side view video on the right of the vehicle as the other one of the side view videos, and the detecting the at least one of the blind spot videos comprises at least one of:

synthesizing the front view video and the first side view video, and detecting a first blind spot video to display on the first pillar display module based on the setting information including locations and dimensions of the first pillar display module, and synthesizing the front view video and the second side view video, and detecting a second blind spot video to display on the second pillar display module based on the setting information including locations and dimensions of the second pillar display module.

13. The method of claim 11, wherein the activating the at least one of the pillar display modules comprises:

activating the first pillar display module in response to the first user input for turning on the turn signal lamp indicating left; or activating the second pillar display module in response to the first user input for turning on the turn signal lamp indicating right.

14. The method of claim 13, wherein the deactivating the at least one of the pillar display modules comprises:

deactivating the first pillar display module in response to the second user input for turning off the turn signal lamp indicating left; or deactivating the second pillar display module in response to the second user input for turning off the turn signal lamp indicating right.

15. The method of claim 8, wherein the activating comprises activating, in response to the first user input to turn on the turn signal lamp indicating a first direction, one of the pillar display modules corresponding to the first direction to display the blind spot video for the first direction of the vehicle, and the first direction is left or right.

* * * * *